(12) United States Patent
Iden

(10) Patent No.: US 9,085,306 B2
(45) Date of Patent: Jul. 21, 2015

(54) DRAG REDUCING DEVICES FOR A LOCOMOTIVE

(75) Inventor: Michael E. Iden, Kildeer, IL (US)

(73) Assignee: UNION PACIFIC RAILROAD COMPANY, Omaha, NE (US)

( * ) Notice: Subject to any disclaimer, the term of this patent is extended or adjusted under 35 U.S.C. 154(b) by 1389 days.

(21) Appl. No.: 12/490,966

(22) Filed: Jun. 24, 2009

(65) Prior Publication Data
US 2010/0326316 A1 Dec. 30, 2010

(51) Int. Cl.
*B61D 17/02* (2006.01)

(52) U.S. Cl.
CPC . *B61D 17/02* (2013.01); *Y02T 30/32* (2013.01)

(58) Field of Classification Search
USPC ............... 105/1.1, 1.2, 1.3; 296/180.1, 180.2, 296/181.5, 181.1; 206/504; 220/23.6
See application file for complete search history.

(56) References Cited

U.S. PATENT DOCUMENTS

| | | | |
|---|---|---|---|
| 2,101,619 A | | 12/1937 | Lentz et al. |
| 2,108,203 A | | 2/1938 | Lentz et al. |
| 2,148,078 A | | 2/1939 | Lentz et al. |
| 2,256,493 A | | 9/1941 | Ragsdale et al. |
| D179,222 S | | 11/1956 | Schaus et al. |
| D220,220 S | | 3/1971 | Joy |
| 3,934,922 A | * | 1/1976 | MacCready et al. ....... 296/180.4 |
| 4,030,779 A | | 6/1977 | Johnson |
| 4,057,280 A | | 11/1977 | MacCready, Jr. et al. |
| 4,210,354 A | * | 7/1980 | Canning .................... 296/180.4 |
| 4,236,745 A | | 12/1980 | Davis |
| 4,257,640 A | * | 3/1981 | Wiley ........................ 296/180.3 |
| 4,343,505 A | * | 8/1982 | Levassor .................... 296/180.2 |
| 4,441,751 A | * | 4/1984 | Wesley ...................... 296/180.1 |
| 4,626,155 A | * | 12/1986 | Hlinsky et al. ................. 410/82 |
| 4,702,509 A | * | 10/1987 | Elliott, Sr .................. 296/180.4 |
| 4,738,203 A | | 4/1988 | Gielow et al. |
| 4,746,160 A | * | 5/1988 | Wiesemeyer .............. 296/180.2 |
| 4,756,256 A | * | 7/1988 | Rains et al. .................... 105/1.1 |
| 4,909,154 A | | 3/1990 | Walker et al. |
| 4,993,125 A | * | 2/1991 | Capron et al. .................. 24/287 |
| 5,222,438 A | | 6/1993 | Ende |
| 5,355,806 A | | 10/1994 | Bieber et al. |
| 5,465,669 A | * | 11/1995 | Andrus ......................... 105/1.1 |

(Continued)

FOREIGN PATENT DOCUMENTS

| | | | | |
|---|---|---|---|---|
| GB | 2270658 A | * | 3/1994 | ............. B62D 37/02 |
| JP | 05-270402 | | 10/1993 | |

OTHER PUBLICATIONS

Photograph of EMD GP60 diesel freight locomotive, obtained from http://www.rrpicturearchives.net/showPicture.aspx?id=185887.

*Primary Examiner* — Jason C Smith

(74) *Attorney, Agent, or Firm* — Pillsbury Winthrop Shaw Pittman, LLP

(57) ABSTRACT

Disclosed is a locomotive of a train with a plurality of aerodynamic drag reducing devices. A locomotive may have a plurality of drag reducing devices attached to a longitudinal end of the locomotive adjacent a walkway of the locomotive. Each drag reducing device may be positioned at an angle with respect to a centerline of the locomotive so as to reduce drag on the locomotive. The drag reducing devices may be mounted to a handrail included on the walkway using separate or single assemblies. Drag reducing devices may also be provided on an opposite or back end of the locomotive, as well as retrofit to a face of the locomotive to reduce drag. Angled winglets may be provided on the drag reducing devices to assist in inducing air flow.

33 Claims, 22 Drawing Sheets

(56) References Cited

U.S. PATENT DOCUMENTS

| | | | | |
|---|---|---|---|---|
| 5,560,088 A * | 10/1996 | Nitsche et al. | | 24/287 |
| 5,562,374 A * | 10/1996 | Plamper | | 410/66 |
| 5,570,981 A * | 11/1996 | Brewster | | 410/70 |
| 5,577,449 A * | 11/1996 | Kleiner et al. | | 105/26.05 |
| 5,676,271 A * | 10/1997 | Reynard | | 220/1.5 |
| 6,286,894 B1 * | 9/2001 | Kingham | | 296/181.5 |
| 6,519,816 B1 * | 2/2003 | Tagaguchi et al. | | 24/287 |
| 6,692,203 B2 * | 2/2004 | Kim et al. | | 410/69 |
| 6,877,793 B2 * | 4/2005 | Cory | | 296/180.1 |
| 6,959,958 B2 * | 11/2005 | Basford | | 296/180.1 |
| 7,008,005 B1 * | 3/2006 | Graham | | 296/180.4 |
| 7,017,508 B2 | 3/2006 | Vanmoor | | |
| 7,114,898 B2 * | 10/2006 | Brewster | | 410/70 |
| 7,178,846 B2 * | 2/2007 | Niskanen | | 294/81.54 |
| 7,207,620 B2 * | 4/2007 | Cosgrove et al. | | 296/180.4 |
| 7,484,918 B2 * | 2/2009 | Brewster | | 410/69 |
| 7,510,358 B2 * | 3/2009 | Brewster | | 410/69 |
| 2004/0239146 A1 * | 12/2004 | Ortega et al. | | 296/180.2 |
| 2005/0139115 A1 * | 6/2005 | Harada et al. | | 105/1.1 |
| 2005/0242601 A1 * | 11/2005 | Niskanen | | 294/81.54 |
| 2005/0258330 A1 * | 11/2005 | Brewster | | 248/500 |
| 2007/0212182 A1 * | 9/2007 | Brewster | | 410/82 |
| 2007/0212183 A1 * | 9/2007 | Brewster | | 410/82 |
| 2008/0105157 A1 * | 5/2008 | Iszkula et al. | | 105/26.05 |
| 2008/0256767 A1 * | 10/2008 | Berns et al. | | 27/35 |
| 2008/0309122 A1 * | 12/2008 | Smith et al. | | 296/180.1 |
| 2009/0047090 A1 * | 2/2009 | Brewster | | 410/80 |
| 2009/0123250 A1 * | 5/2009 | Brewster | | 410/82 |
| 2009/0179456 A1 * | 7/2009 | Holubar | | 296/180.4 |
| 2009/0278381 A1 * | 11/2009 | Iden et al. | | 296/180.4 |
| 2009/0278382 A1 * | 11/2009 | Iden et al. | | 296/180.4 |
| 2010/0102574 A1 * | 4/2010 | Brewster et al. | | 292/229 |
| 2010/0326316 A1 * | 12/2010 | Iden | | 105/1.1 |

* cited by examiner

DRAG REDUCING DEVICES FOR A LOCOMOTIVE

BACKGROUND

1. Field of Invention

The present invention is generally related to reducing aerodynamic drag on a locomotive.

2. Description of Related Art

Using one or more locomotives in a train to move railroad freight or passenger cars is well known. For example, as shown in FIG. 1, a series 104 of stacked intermodal containers may be provided on stack cars 113 and pulled by one or more locomotives 102 along a track 103 to form a train used for transporting goods on land. Though transporting goods in containers, such as intermodal containers in a double stack, assists in lowering rail haul costs, it would be beneficial to further reduce such costs associated with rail transportation. It would also be useful to reduce costs associated with freight or passenger trains. For example, the expenses associated with operating a fuel (e.g., diesel) powered locomotive may significantly increase based on rising fuel prices. Additionally, exhaust emissions of diesel fuel may cause damage and be harmful to the environment.

To decrease such costs and disadvantages, it is advantageous to provide aerodynamic enhancements to the train. However, contemporary North American diesel freight locomotives are designed and manufactured with little to no consideration for aerodynamic drag reduction. Engineering designs of locomotive body structures are typically designed for crashworthiness (of the front nose and operator cab) and strength (supporting the onboard machinery, handling tractive and braking forces, etc.). Typically, locomotives are manufactured by companies such as Electro-Motive Diesel, Inc. ("EMD") and General Electric ("GE") to meet standardized designs, with only minor changes in body details and appurtenances possible, if specified by the locomotive customer as a purchase requirement. That is, including special aerodynamic enhancements is generally impractical in the locomotive manufacturing environment, as both locomotive builders manufacture the basic body parts to standardized semi-mass-produced designs, shapes, materials, etc. To manufacture contemporary freight locomotives with aerodynamic enhancements could entail expensive re-engineering, add time and complexity to manufacturing processes, and increase locomotive as-delivered cost. As such, building contemporary road freight locomotives in North America with aerodynamic enhancements may not be likely to occur in the near future.

One attempt by a locomotive manufacturer to improve the front-end aerodynamics of a contemporary North American freight diesel locomotive was the building, by the Electro-Motive Division of General Motors (today known as EMD), in 1980 of three (3) 3800 horsepower 4-motor GP60 sales demonstrator locomotives, which appear to incorporate certain "rounded corners" on the front nose and operator cab front face. However, as noted above, locomotive builders have increasingly, over the past 3 decades, appeared to migrate toward a more boxey locomotive body shape in the interest of reducing manufacturing time, expense, and difficulty.

Thus, systems and methods for improving aerodynamic drag on pre-existing, standardized locomotives is desirable.

SUMMARY

One aspect of the invention provides a locomotive having a body; track engaging wheels; and a power system in the body for driving the wheels to move the locomotive along a pair of tracks. The locomotive also has a walkway provided at a longitudinal end of the locomotive. The walkway includes a handrail extending vertically and laterally in a spaced relation to a face of the longitudinal end of the locomotive. A plurality of aerodynamic drag reducing devices are attached to the longitudinal end of the locomotive adjacent the walkway. Each drag reducing device is positioned with respect to a centerline of the locomotive so as to reduce drag on the locomotive. In some cases, additional drag reducing devices may be provided on an opposite end, and may include at least one pair of winglets, for inducing laminar flow of air.

Another aspect of the invention includes a method for reducing aerodynamic drag of a locomotive. The locomotive has a body; track engaging wheels; and a power system in the body for driving the wheels to move the locomotive along a pair of tracks. The locomotive also has a walkway provided at a longitudinal end of the locomotive, and includes a handrail extending vertically and laterally in a spaced relation to a face of the longitudinal end of the locomotive. The method includes: providing a plurality of aerodynamic drag reducing devices, and mounting the plurality of aerodynamic drag reducing devices to the longitudinal end of the locomotive adjacent the walkway. Each drag reducing device is positioned with respect to a centerline of the locomotive so as to reduce drag on the locomotive. In some cases, the method further includes providing additional drag reducing devices on an opposite end of the locomotive, and each device may include at least one pair of winglets.

In another aspect of the invention, a train having at least one locomotive and a series of cars with wheels is provided. The series has at least a first car and a second car. The at least one locomotive has a body and track engaging wheels. The at least one locomotive is configured to assist in moving the series of cars. A power system is provided in the locomotive for driving the track engaging wheels of the locomotive to move the locomotive and the series of cars along a pair of tracks. A walkway is provided at a longitudinal end of the locomotive. The walkway includes a handrail extending vertically and laterally in a spaced relation to a face of the longitudinal end of the locomotive. Also, a plurality of aerodynamic drag reducing devices are attached to the longitudinal end of the locomotive adjacent the walkway. Each drag reducing device is positioned with respect to a centerline of the locomotive so as to reduce drag on the train.

In yet another aspect, a locomotive is provided including: a body having a front longitudinal end and a back longitudinal end; track engaging wheels; a power system in the body for driving the wheels to move the locomotive along a pair of tracks; and a plurality of aerodynamic drag reducing devices attached to the back longitudinal end of the locomotive body. Each drag reducing device is mounted on a face of the back longitudinal end. Each drag reducing device also includes a curved surface for reducing drag on the locomotive. In some cases, the drag reducing device may have at least one pair of winglets, the pair of winglets having first and second angled sections mounted an at angle relative to each other so as to induce laminar flow of air and reduce drag on the locomotive.

Other objects, features, and advantages of the present invention will become apparent from the following detailed description, the accompanying drawings, and the appended claims.

DETAILED DESCRIPTION OF THE PREFERRED EMBODIMENT(S)

It is a goal of the present invention to reduce the amount of aerodynamic drag and vortices created in relation to one or more locomotives 102 provided in a train 100 during transportation in a forward direction 134. Generally, emphasis in North American freight locomotive manufacturing is on safety, meeting operational requirements with respect to pulling ability and diesel engine fuel economy, minimizing of engine exhaust emissions to comply with U.S. EPA regulations, manufacturing simplicity, and as-delivered cost to the locomotive customer. However, the designs which are thus standardized based on these requirements are not necessarily optimally aerodynamic and efficient in shape.

The amount of aerodynamic drag (resistance) of a train 100 may be generally defined as being substantially proportional to the square of the speed at which it is moving. For example, a locomotive moving at a speed of 35 miles per hour (mph) may develop aerodynamic resistance forces which are one-fourth (¼) of the equivalent forces if the same locomotive is moving at a speed of 70 mph, i.e., the square of 70 is four times the square of 35. Thus, when a train is moving at double its speed, the aerodynamic component of resistance quadruples. Therefore, as further explained below, the one or more locomotives 102 provided in train 100 are selectively equipped, on a retrofit basis, with aerodynamic drag reducing devices so as to redirect at least some of the air movement on and around the locomotive 102 when the train 100 is in motion to reduce the amount of aerodynamic drag in relation to the locomotive.

Figure 1:
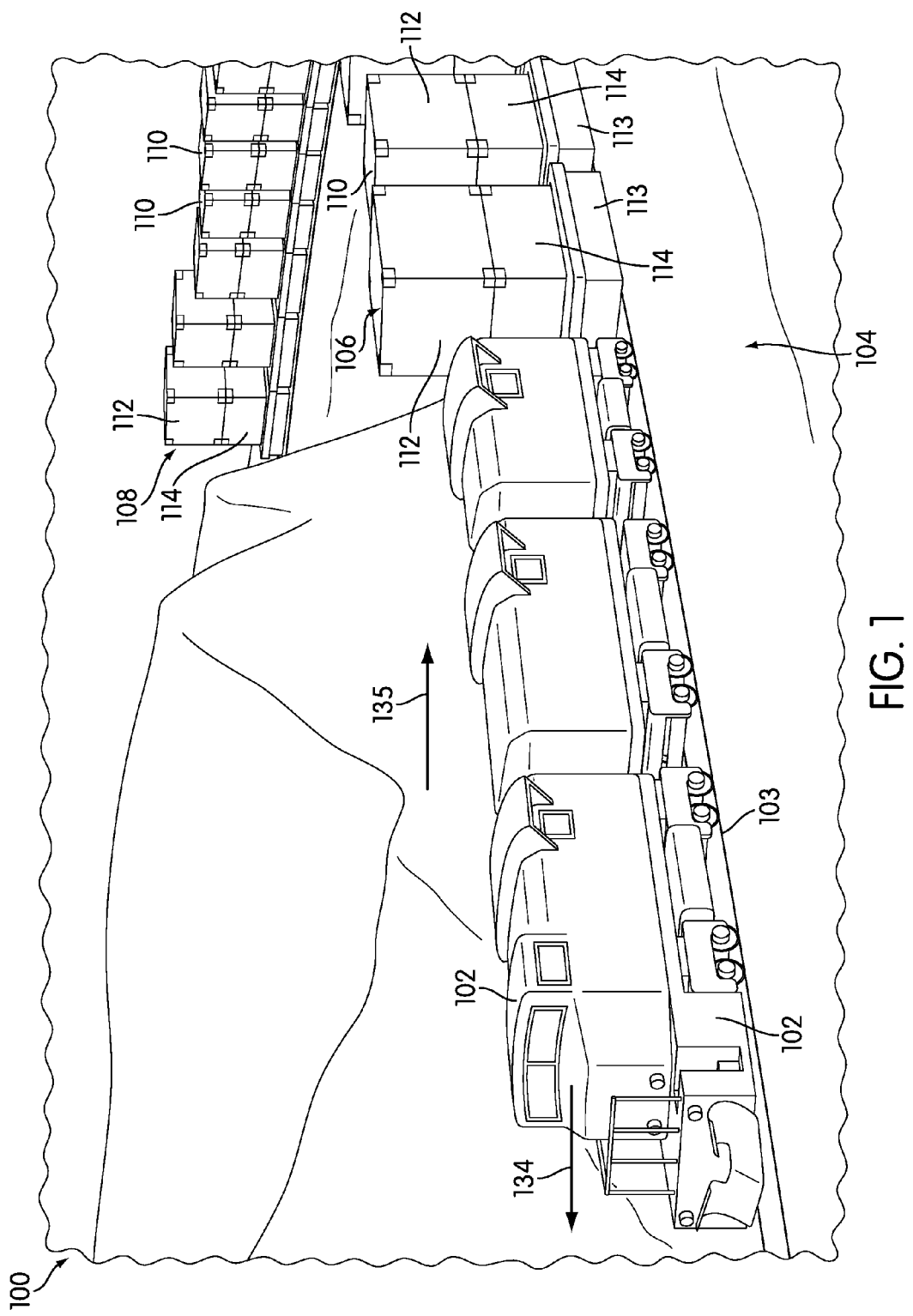
FIG. 1 illustrates a train comprising a locomotive pulling a series of cars.
Figure 2:
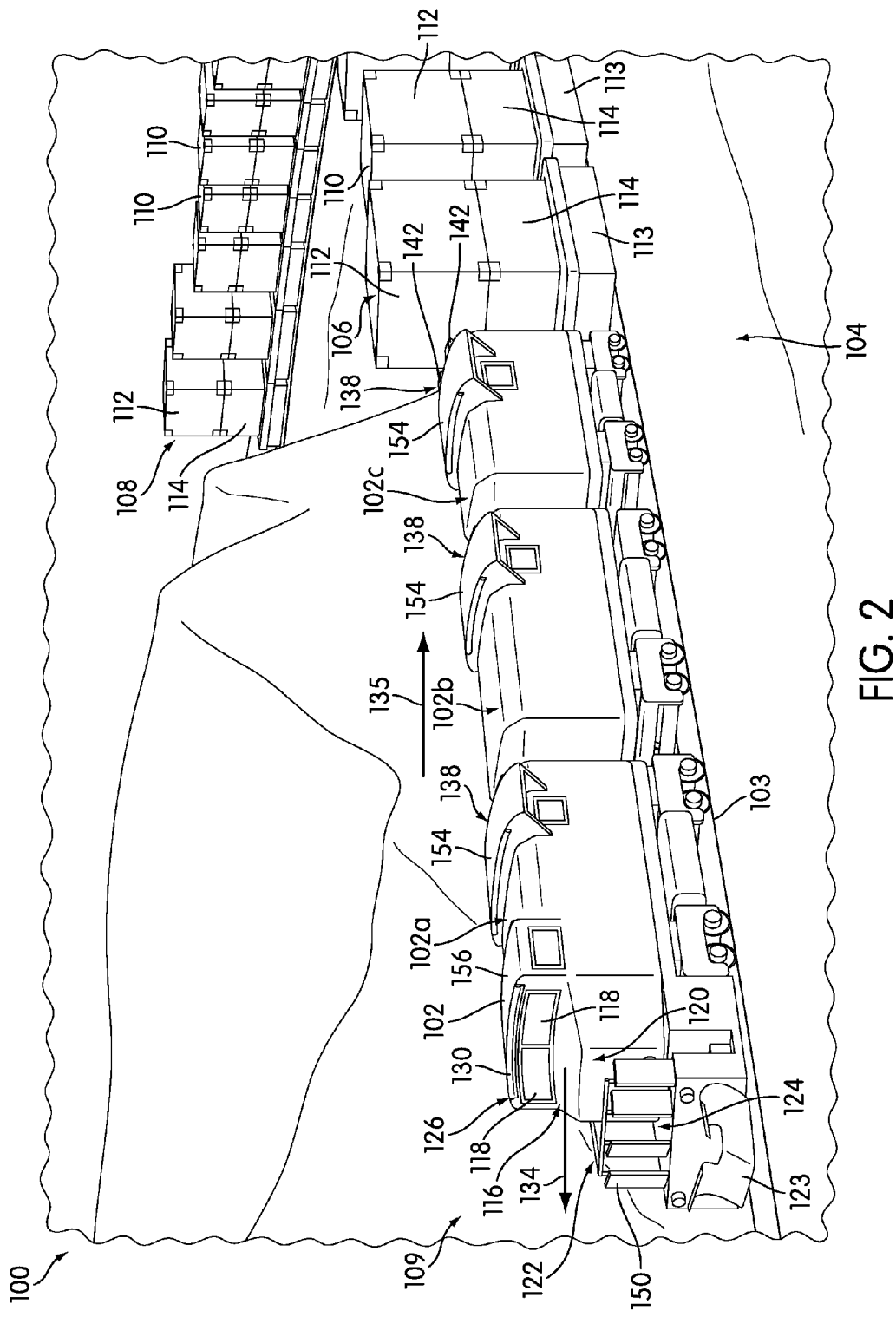
FIG. 2 illustrates the train of FIG. 1 comprising a system of aerodynamic drag reducing devices on the locomotive in accordance with an embodiment of the present invention.

Referring now more particularly to the drawings, FIGS. 1 and 2 illustrates a train 100 comprising a locomotive 102 pulling a series 104 of cars 113. The term "locomotive" as provided herein refers to a device which assists in moving cars in a train. The locomotive 102 comprises track engaging wheels and a power system. The power system is located in a body of the locomotive and provides power for driving the wheels to move the locomotive along a pair of tracks 103 or rails. The locomotive 102 may be a vehicle that is diesel-powered and configured to pull containers in the series 104 via wheels of cars 113 on the pair of railroad tracks or rails 103, as is known in the art. In some cases, at least one locomotive may be provided between a first car with one or more containers 106 and a second car with one or more containers 108 to assist in transporting the cars/containers along the track 103.

The locomotive 102 may be manufactured according to any number of designs or standards. In some embodiments, locomotive 102 may comprise an existing manufactured model. For example, locomotive 102 may be one of the more common locomotives in current service on railroads in the United States, Canada, and Mexico such as the EMD models SD70M, SD70MAC, SD70DCe and SD70ACe, or GE models C40-8W, C41-8W, C44-9W, C44AC, ES44DC, and ES44AC.

The body of the locomotive 102 is generally of longitudinal shape. Locomotive 102 comprises a front end 109 and back end 138, the front end 109 provided at a first longitudinal end of the body and the back end provided at a second, opposite longitudinal end of the body. The front end 109 may be a leading end when the train 100 is in motion, for example. The locomotive 102 may also include an underframe (or platform), a front and/or pilot snow plow 123, one or more walkways 122 and step areas, and hand rail areas 124, further described below. Locomotive 102 also comprises a front face 116. The front face 116 may include a front nose 120 and one Or more windshields 118, for example. The windshield(s) 118 may allow an operator in the locomotive to see a route along the track 103, for example.

In some cases, locomotive 102 may comprise a plurality of cabs or carbodies, such as cab 102a, 102b, and 102c as shown in FIG. 2. Cabs 102b and 102c may be trailing cabs, for example. In some cases, each cab 102a-102c may be provided as a housing for a component of the locomotive 102. For example, cab 102a may function as an operator cab or an alternator cab. Cab 102b may be an engine cab or compartment and cab 102c may be a radiation cab. The radiation cab 102c may comprise a radiator or cooling section for cooling an engine housed in engine cab 102b. In some embodiments, each cab 102a-102c may also comprise a front end 109, back end 138, and cab or body section. In some embodiments, each of the aforementioned sections (e.g., operator, engine, and radiation sections) may be provided in a single locomotive 102. In other embodiments, locomotive 102 may refer to a collection of two or more locomotives that are connected to each other to form a locomotive consist. In any case, in some embodiments, the back end 138 of the locomotive 102 may be attached or coupled to move a series 104 of cars of the train 100.

As shown, the series 104 may have at least a first car 106 and at least a second car 108 carrying stacks (e.g., double stacks) of containers. A "container" as used herein is defined as a device for carrying objects, such as freight, goods, or passengers, in a train, and should not be limiting. For example, though the Figures depict an embodiment that shows a plurality of intermodal containers (in a stacked configuration) being pulling by locomotive 102, it is to be understood that such an embodiment should not be limiting. As such, the locomotive 102 may be pulling any type of "container" which may be a single container, a plurality of containers, or a plurality of stacked containers. Of course it is also to be understood that the locomotive 102 may be pulling any type of car 113, including, but not limited to, flat cars, gondola cars, tanks, and well-cars.

In an embodiment, the first car 106 is defined as a first, leading car attached and adjacent to the locomotive 102, which may have one or more containers therein or thereon. In an embodiment, the second car 108 may be the last or trailing car in the series 104 in the train 100, which may also have one or more containers therein or thereon. Each car may be defined as one that follows a locomotive 102, or, additionally and/or alternatively, is attached to a locomotive 102 within the train 100 (e.g., should a locomotive 102 be attached within the length of the train, such as at a midway point, the car may be ahead or behind the locomotive or a consist). Alternatively, and more typically, a plurality of intermediate cars 110, with or without containers, may also be provided between the first car 106 and the second car 108. In an embodiment, one of the intermediate sets 110 of cars may be referred to as a second set. In another embodiment, a trailing car may be referred to as the first car. Also, each of the cars 113 in the train may defined as a car carrying one or more containers. Thus, the car 113 and a container may form a set, or two containers may form a set. Such terms should not be limiting. For example, the first car may be referred to as a first set, the second car may be a second set, etc.

In some embodiments, a set of containers may be provided on a stack car 113, for example. The stack car 113, also sometimes referred to as a double stack car or well car, is a railroad car that is designed to carry containers, such as intermodal containers. The stack cars 113 are connected in series and are pulled (or pushed) by one or more locomotives 102 along the track 103 via wheels (which engage the track or rails 103). In some embodiments, each set of containers may be provided on a car or chassis having wheels for engaging the track 103. In some embodiments, the wheels may be provided on a frame and/or directly attached to each container.

In some cases, such as shown by the illustrated embodiment, the sets 106, 108, 110 of cars may have containers which are provided in a stacked relationship. For example, each set of containers may comprise a top container 112 stacked or mounted on a bottom container 114, also referred to as a double stack. Such a configuration may be provided when the sets comprise intermodal containers, for example. The mounting and/or locking of top and bottom containers 112 and 114, respectively, to each other in a stack is generally known in the art. It is noted that an intermodal container may be defined as a box container, bulk container, tank, or other storage device which may comprise a structure or frame. In some embodiments, the container is provided in a stack car 113. In some cases, the containers allow for stacking and mounting on top of one another. The sets of containers may include containers that are referred to as "ISO containers" that are manufactured according to specifications from the International Standards Organization (ISO) and are suitable for multiple transportation methods such as truck and rail, or rail and ship. However, the dimensions or sizes of the containers should also not be limiting. For example, standard ISO shipping containers comprising dimensions of 10 to 53 feet long, 8 feet to 9 feet 6 inches high, and 8 feet wide may be used for transportation.

Additionally, as noted above, the type of product held by the containers should not be limiting. For example, in the illustrated embodiments, though an intermodal box container is generally shown in the Figures, the train may be transporting bulk containers 20 to 28 feet long and/or tanks designed to hold liquids with a holding capacity of 4000-6000 gallons. Also, for example, the containers may comprise freight or passengers.

Further, it again should be noted that although locomotive 102 is shown attached to a first set/car 106 for pulling the series 104, a plurality of locomotives 102 may be provided throughout the length of the train 100. Thus, though the aerodynamic drag reducing devices will be described with respect to a first, pulling locomotive 102 at the front of the train 100, the locomotive(s) 102 and the aerodynamic drag reducing devices attached thereto should not be limiting in their location along the train 100 (e.g., such a locomotive may be provided within the length of the train). Additionally, should the locomotive 102 have a plurality of cabs or carbodies, the cabs may be attached in the train 100 in any number of configurations. For example, as shown in FIG. 2, a back end 138 of the radiator cab 102c may be attached to the first set 106 or car.

As the locomotive 102 moves in a forward direction, as indicated by arrow 134, the air flow (as indicated by arrow 135) creates drag in an opposite direction. Some wind tunnel studies have shown, for example, that the first 20% of a train 100 produces the most drag. Some high pressure spots include, but are not limited to, a locomotive's front pilot/snow plow area 123 at the front end 109 (e.g., including vertical surfaces above a handrail 124 and/or a walkway 122), vertical surfaces of a locomotive's front nose 116, and vertical surfaces above or around windshields 118. Thus, providing devices on the locomotive 102 that assist in reducing the overall aerodynamic drag of the train 100 would be beneficial. Additionally, air forces or vortices may be formed around the edges of the locomotive 102 (and between adjacent cabs 102a-102c, if provided) when moving in a forward direction 134 at high speeds. Attaching aerodynamic drag reducing devices such as 130, 142, 148, 150, 158 and/or 160 as further described herein to reduce the drag and vortices of the locomotive 102 of the train 100 while moving provides a plurality of benefits, as will become further evident.

FIGS. 2-8 illustrates the train 100 of FIG. 1 comprising a system of aerodynamic drag reducing devices 130, 142, 148, 150, 158, and 160 in accordance with an embodiment of the present invention. In an embodiment, a plurality of aerodynamic drag reducing devices may be provided on the locomotive 102 to assist in reducing the amount of drag of a moving train 100. Each aerodynamic drag reducing device 130, 142, 150, 158, and 160 comprises a drag reducing fairing configured to reduce aerodynamic drag when the locomotive 102 is in motion (e.g., moving forward). The plurality of aerodynamic drag reducing devices may be configured to be mounted to the locomotive. In some embodiments, as will be further described with respect to FIGS. 3-8, each drag reducing device is associated with a predetermined location on the locomotive 102. In some cases, the predetermined locations may include at least one location on the front end 109, the back end 138, or the cab of the locomotive 102 (or its cabs 102a-102c), such as the high pressure spots noted above. The plurality of drag reducing devices may be mounted to any number of predetermined locations of the locomotive 102. The aerodynamic drag reducing devices act to reduce aerodynamic resistance or drag by: (1) redirecting airflows from large flat surfaces of the locomotive, and (2) reducing vortices ("eddy currents") at places such as the sharply-angled exterior corners of the nose 120 and back end 138.

Figure 3:
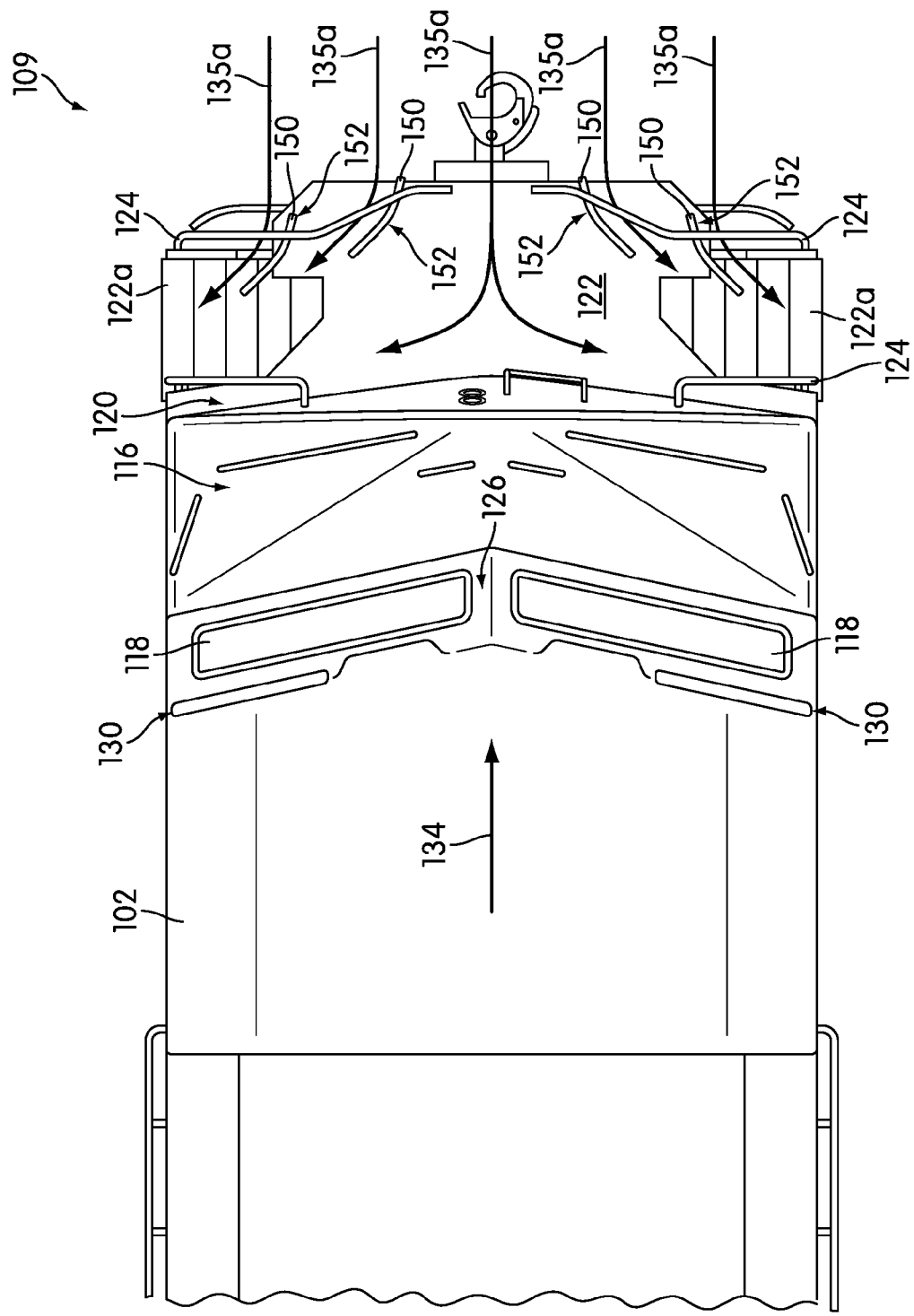
FIG. 3 illustrates a top view of a locomotive having an aerodynamic drag reducing devices attached thereto in accordance with an embodiment of the present invention.
Figure 4:
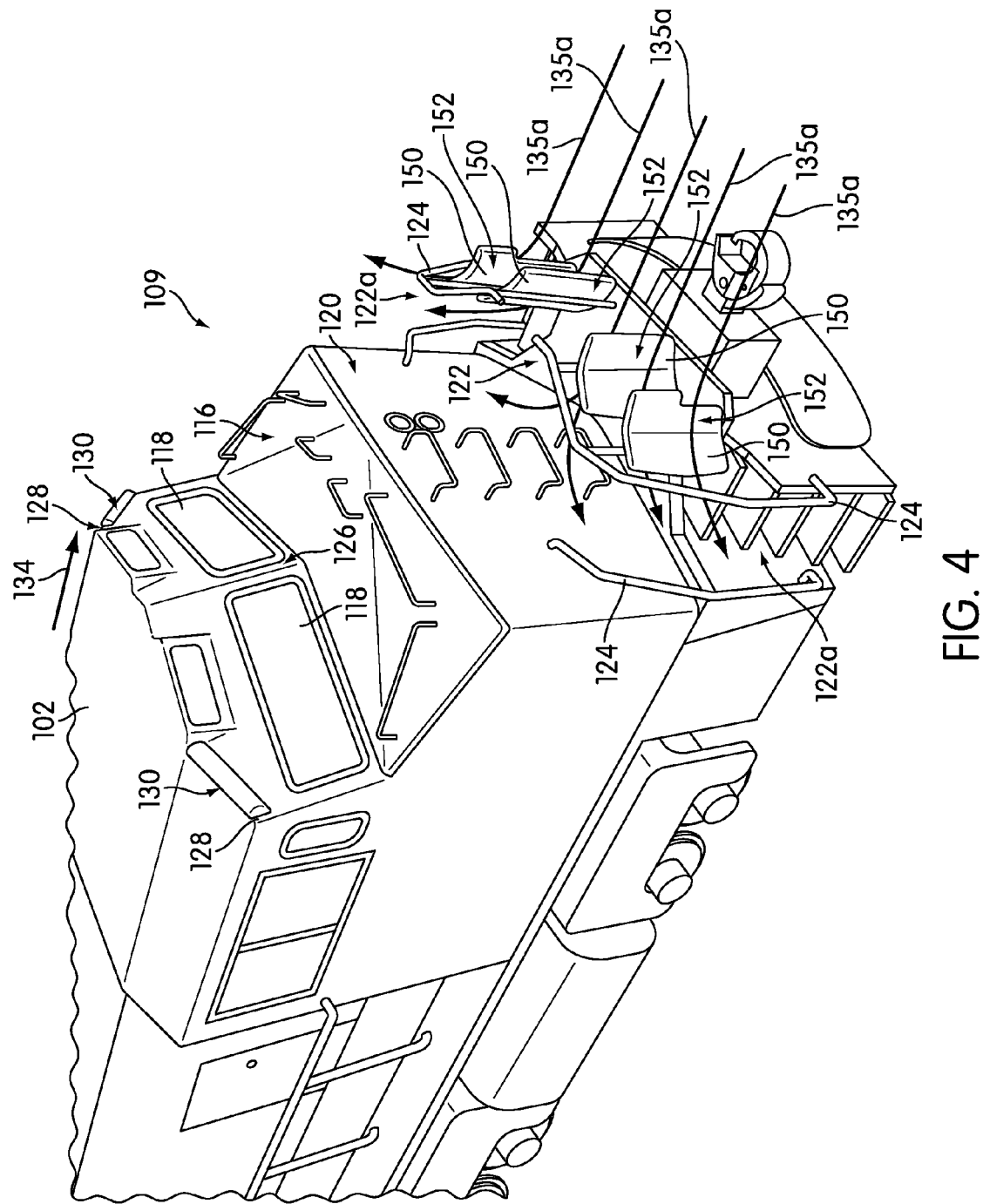
FIG. 4 illustrates a perspective view of a front end of the locomotive of FIG. 3 with the aerodynamic drag reducing devices in accordance with an embodiment of the present invention.
Figure 5:
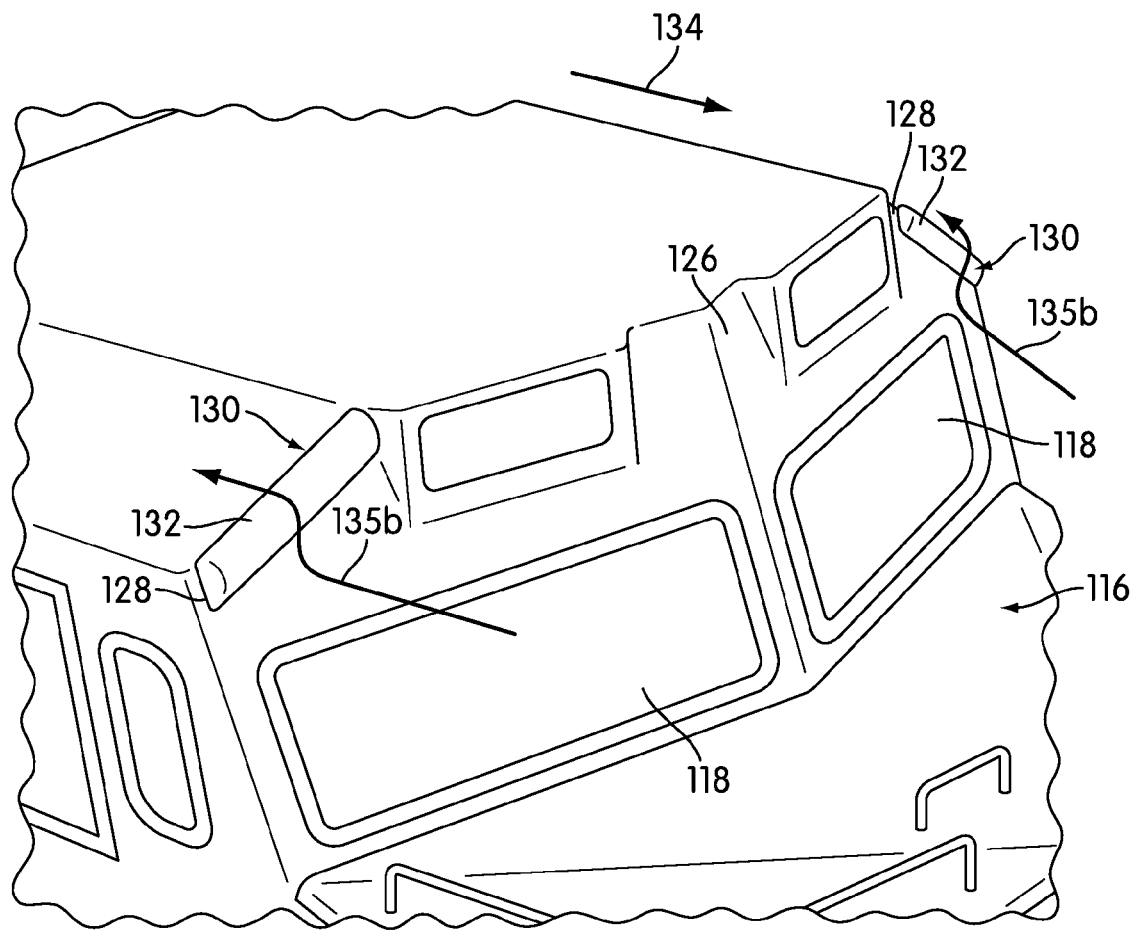
FIG. 5 illustrates a detailed view of part of a front face of the front end of the locomotive having aerodynamic drag reducing devices thereon in accordance with an embodiment of the present invention.

FIGS. 3-5 illustrate views of the front end 109 and front face 116 of a locomotive 102 having a plurality of aerodynamic drag reducing devices 130 and 150 thereon in accordance with embodiments of the present invention. The front face 116, nose 120, or front end 109 in general comprises substantially angled surfaces. As previously noted, for example, the front end 109 may include a walkway 122, including step areas 122a and a platform to allow personnel (e.g., operator or engineer) access to the front end 109 of the locomotive. The area of the walkway 122 may also include handrail(s) 124 having vertical members and horizontal members extending vertically and laterally in a spaced relation to the front face 116 of the longitudinal end 109 of the locomotive 102. The walkways 122 may be generally defined as the area between the handrails 124 and the front nose 120.

As the train 100 moves forward, air typically flows through the handrails 124 and onto and over the front nose 120, thereby increasing drag. As such, drag reducing devices may be attached to the front end 109 of the locomotive. For example, a plurality of aerodynamic drag reducing devices 150 may be configured to be mounted adjacent the walkway 122. The devices 150 are mounted in such as manner so as to redirect or deflect air flow in a controlled manner away from the front nose 120 and toward the sides of the locomotive, as represented by arrows 135a, during travel. For example, each device 150 is angled with respect to a centerline of the locomotive 102 so as to reduce drag on the locomotive. In some embodiments, the devices 150 may be mounted on a platform near the walkway 122 on the front end 109, such as in between handrails 124. In some embodiments, the devices 150 may be attached to the front handrails 124. In some embodiments, the devices 150 are mounted to the vertical members of the handrails 124. Generally, the devices 150 are mounted in such a manner such that they do not interfere with the walkway 122 or platform area itself or the leading edge thereof. For example, the devices 150 may be mounted and arranged so as to not obstruct lateral passage of a person on or along the walkway 122 and also so as not to interfere with use of a coupling 119 on the front end 109 of the locomotive.

Preferably, the proximal edges of the devices 150 are at least approximately 18 inches to approximately 24 inches from the face of the locomotive, thus allowing free passage on a walkway 122. In some embodiments, the location or distance of the proximal edges of the devices 150 may be determined based off of the dimensions of the walkway 122, for example. Likewise, it is preferred that the distal edges of the devices 150 do not extend to the coupling 119 on the end 109 of the locomotive (e.g., see FIG. 3). Generally, such an assembly is required so that access to the coupling and the front of the locomotive is uninhibited.

Further, the shape of the devices 150 may also assist in directing the airflow. The devices 150 generally comprise a radiussed surface or edge. As can be seen in FIGS. 3 and 4, for example, the devices 150 may comprise a curved configuration having a solid body 152 for directing air laterally towards the sides of the train and away from a front nose 120. The plurality of aerodynamic drag reducing devices 150 each comprise curved configurations which concave away from the locomotive and convex toward the locomotive. In an embodiment, each of the aerodynamic fairing devices 150 may comprise a single, contiguous shape that is attached relative to the handrails 124 and walkway(s) 122. In some embodiments, the aerodynamic drag reducing devices 150 may comprise a plurality of fairings, such as a first and second fairing device, to form a substantially curved configuration when mounted in a manner that is similar to that as represented by curved body 152, for example.

In the illustrated embodiment, the devices 150 are mounted generally vertically to vertical members of the handrail(s) 124. The devices 150 are each coupled with a leading edge thereof close to the locomotive centerline, and a trailing edge farther from the centerline. This orientation allows the solid body 152 of the devices 150 to divert the airflow laterally towards the sides of the locomotive 102, thus reducing impingement of the airflow on the locomotive's front face 116 and the associated drag.

The devices 150 may be mounted such that each device 150 extends outwardly and towards the body of the locomotive from a distal edge thereof to a proximal edge thereof. As is shown in the drawings, the devices 150 may be curved, with a concave face thereof facing forwardly and outwardly, and a convex face thereof facing rearwardly and inwardly. This enhances the lateral directing of the airflow towards the lateral sides of the locomotive. As such, the curved configuration also allows the devices 150 to have a longer effective aerodynamic shape without extending too far forward of the handrail 124 (which could interfere with the front coupling) or to far rearward of the rail (which could interfere with the free movement of personnel on the walkway).

The devices 150 may be mounted at a plurality of angles with respect to the centerline of the locomotive 102. The angle for positioning each of the devices 150 may be orientated based on the specifications of the walkways 122 of the respective locomotive 102. In some cases, each of the devices 150 may be provided at similar angles. In some cases, each of the devices 150 may be provided at different angles.

The dimensions of each of the devices 150 may be such that they corresponding to the dimensions of the locomotive 102. For example, the devices may comprise a length, width, or height such that the devices 150 may be mounted or attached between the vertical and horizontal members of the handrail 124. Such dimensions, therefore, should not be limiting.

Aerodynamic drag reducing devices 150 may be attached or mounted to the walkways 122, handrails 124, or a location adjacent thereto (e.g., platform) in any number of ways. In some cases, for example, devices 150 may also comprise a mounting device or attachment frame. In some cases, devices 150 may comprises a rotatable (yet locking) mounting device for adjustment of the angle of the device 150 with respect to the centerline of the locomotive 102. The embodiments disclosed with reference to FIGS. 9-12b and 15-21, further described below, illustrate two examples of mounting frame assemblies that may be used to mount the drag reducing devices. However, the methods and/or devices for mounting the aerodynamic drag reducing devices 150 should not be limiting.

Figure 13:
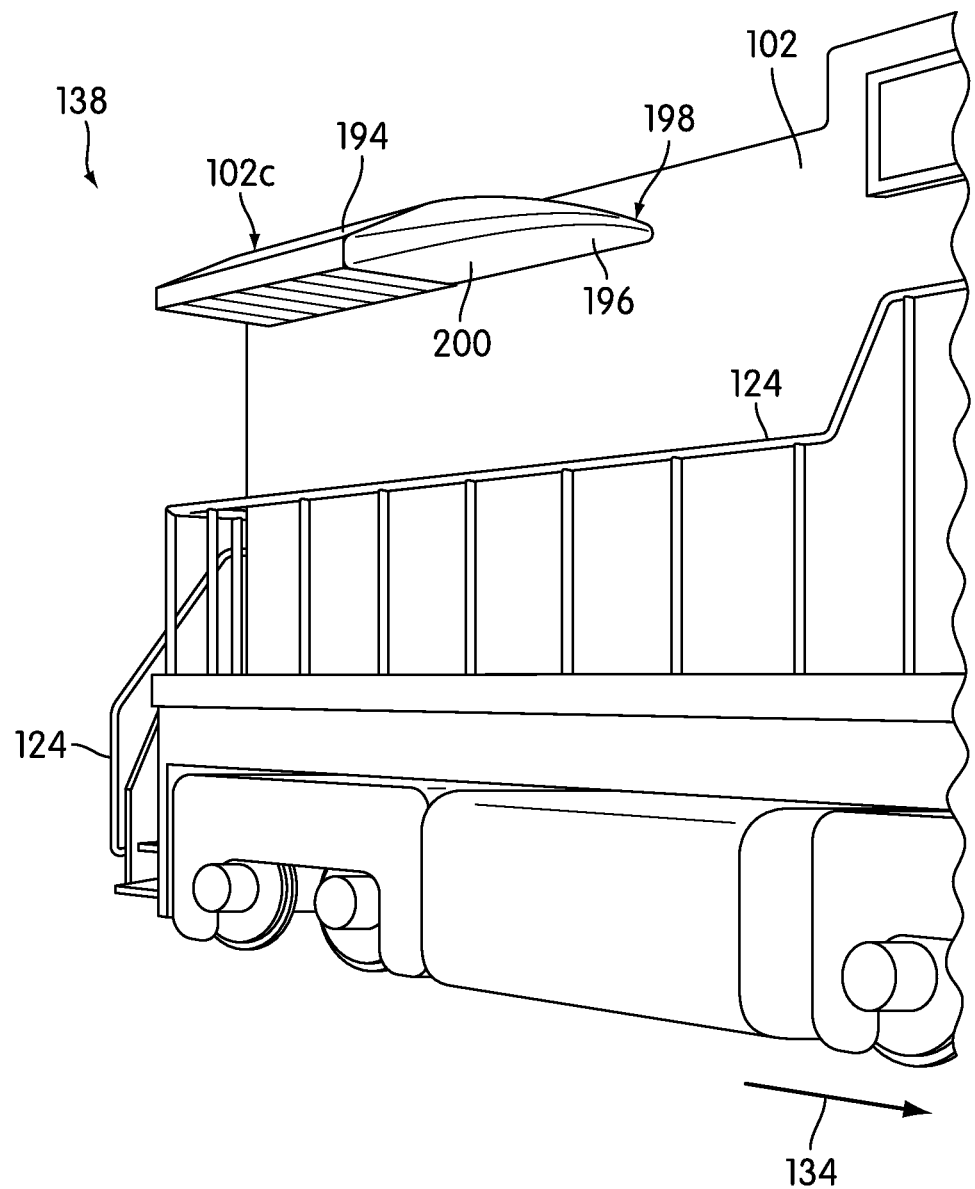
FIG. 13 illustrates a perspective view of part of a side face of a side of the locomotive having a aerodynamic drag reducing device thereon in accordance with an embodiment of the present invention.

In some cases, one or more walkways 122 and handrails 124 may also or alternatively be provided on a side of the body or back end 138 of the locomotive 102 (e.g., see FIG. 13), or in a location along its cabs 102a-102c that may need to be accessed by personnel, for example. In a similar manner, one or more drag reducing devices may be provided adjacent such walkway areas 122 or handrails 124 on the side and/or back ends in order to assist in directing the air flow to reduce drag and any suction effects at such locations on the locomotive. For example, devices of curved configuration similar to aerodynamic drag reducing devices 150 may be additionally or alternatively provided to direct airflow away from the back, opposite end 138 of the locomotive 102, by mounting devices 150 adjacent the walkway 122 and handrails 124 in a position to direct air away from the centerline of the locomotive. Also, FIG. 13 illustrates a perspective view of part of a side face of a side of the locomotive 102 having a aerodynamic drag reducing device 196 thereon in accordance with an embodiment of the present invention. Specifically, the radiator cab 102 may comprise devices such as a radiator extension 194 that extends from the locomotive 102. Such a device or part may further produce resistance as the locomotive 102 moves in a forward direction 134. Thus, in an embodiment, a side aerodynamic drag reducing device 196 may be positioned on the locomotive 102. As an example embodiment, the side device 196 may comprise a front portion 198 and a back portion 200. The back portion 200 may be dimensioned to fit with the radiator extension 194 when mounted. As shown, the surfaces of the side device 196 are generally round and taper inwardly from the back portion 200, towards the front portion 198 and towards the side face of the locomotive 102. This allows for the reduction of eddy currents and other air resistance as the locomotive 102 moves forwardly. Of course, it is envisioned and within the scope of this invention that other shapes and devices may also be provided on the side surfaces or faces of the locomotive 102 to reduce aerodynamic drag.

Also shown in FIGS. 3-5 are a plurality of aerodynamic drag reducing devices 130 which are attached adjacent leading edges 126. The leading edges 126 are provided on a front face 116 of the locomotive 102. Each edge 126 comprises a corner 128. In some cases, they may be adjacent or above the windshield 118, for example. In order to improve air movement around the edges 126 and corners 128, aerodynamic drag reducing devices 130 are attached near corners 128. As the train 100 or locomotive 102 moves in a forward direction 134, air may be directed by the devices 130 over top of at least the edges 126 and corners 128, as represented by arrows 135b, thus reducing the resistance or drag around the leading edges 126 and corners 128.

As shown in greater detail in FIG. 5, the devices 130 may be retrofit such that they comprise a configuration formed according to the specifications of the locomotive 102 and its front face 116. The dimensions of the devices 130 should not be limiting. For example, in some embodiments, the devices 130 may be formed such that they are of similar length as the length of each leading edge 126. The devices 130 may comprise a first side and a second side. In some embodiments, the first side has substantially rounded construction, and a second side of substantially flat construction. For example, the first side may provide the fairing portion 132 for directing or redirecting air movement (as represented by arrow 135), and the second side may be used for attaching the devices to the surfaces of the locomotive. The devices 130 generally comprise a substantially rounded fairing portion 132 to assist in directing air in a direction 135b therearound edges 126 and the corners 128 as the train moves in a forward direction 134. That is, the rounded portions 132 assist in streamlining the bluff body provided by front face 116 and the windshield panels 118.

Aerodynamic drag reducing devices 130 may be attached in any number of ways. For example, in some embodiments, it is envisioned that the devices 130 are attached using securement methods including, but not limited to, adhesives and fasteners as known in the art. In some embodiments, industrial strength adhesive structural foam tape, or conventional threaded fasteners may be used to attach the devices 130. For example, the devices 130 may be retrofit and applied to the locomotive using a two-sided or dual-sided structural tape. In some cases, the second side of the device 130 comprises a device for mounting. In some embodiments, drag reducing devices 130 further comprise an attachment frame that is use to assist in mounting the devices on the locomotive. Other securement devices such as threaded fasteners or bolts may also be used for attachment or mounting.

Figure 22:
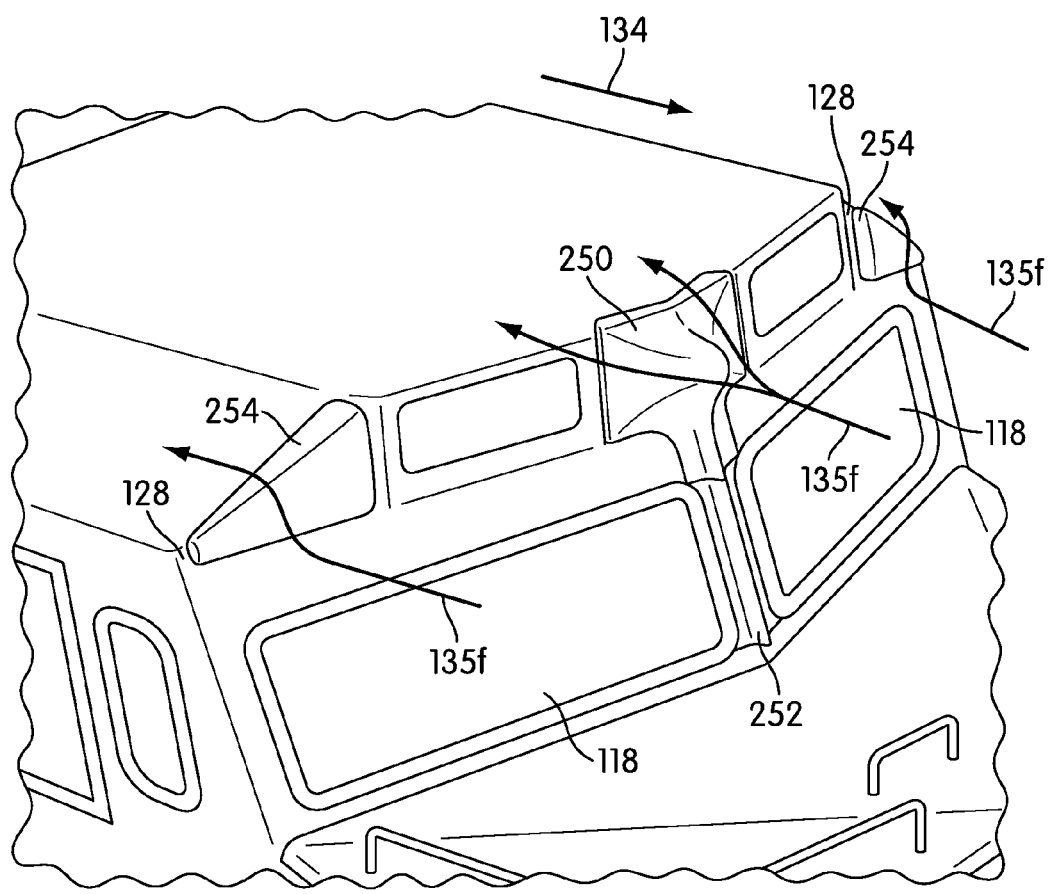
FIG. 22 illustrates a detailed view of part of a front face of the front end of the locomotive having alternate aerodynamic drag reducing devices thereon in accordance with an embodiment of the present invention.

FIG. 22 illustrates a detailed view of part of a front face of the front end 109 of the locomotive 106 having alternate aerodynamic drag reducing devices 250 and 254 thereon in accordance with an embodiment of the present invention. Specifically, FIG. 22 illustrates drag reducing devices 254 of alternate shape which may be provided and attached adjacent leading edges 126 and corners 128. The drag reducing devices 254 comprise a substantially triangular shape and are designed to comprise rounded surfaces and edges to reduce resistance. The aerodynamic drag reducing devices 254 are attached near corners 128. As the train 100 or locomotive 102 moves in a forward direction 134, air may be directed by the devices 254 over top of at least the edges 126 and corners 128, as represented by arrows 135f, thus reducing the resistance or drag around the leading edges 126 and corners 128.

The devices 254 may be retrofit such that they comprise a configuration formed according to the specifications of the locomotive 102 and its front face 116. The dimensions of the devices 254 should not be limiting. For example, in some embodiments, the devices 254 may be formed such that they are of similar length as the length of each leading edge 126 of the corners 128. The devices 254 may comprise a first side and a second side. In some embodiments, the first side has substantially rounded construction, and a second side of substantially flat construction. For example, the first side may provide the fairing portion for directing or redirecting air movement (as represented by arrow 135f), and the second side may be used for attaching the devices to the surfaces of the locomotive. The devices 254 generally comprise a substantially rounded fairing portion to assist in directing air in a direction 135*f* therearound edges 126 and the corners 128 as the locomotive moves in a forward direction 134. That is, the rounded portions assist in streamlining the bluff body provided by front face 116 and the windshield panels 118.

Furthermore, the embodiment in FIG. 22 illustrates examples of front face drag reducing devices 250 and 252 which may be designed to be mounted in a center of the front face of the locomotive 102 to further reduce drag associated with its edges 126. Drag reducing device 250 may be provided in a center location by a front edge 126 on the locomotive face above the windshield panels 118, for example. As shown, drag reducing device 250 may comprise a bulbous or rounded edge portion for directing air therearound and upwardly over the edges 126 and corners 128 of the front face. The drag reducing device 250 may also include a small extension portion with rounded face portions for increasing air movement with respect to the front face. Furthermore, in some embodiments, a large extending drag reducing device 252 may be provided between the windshield panels 118 for drag reduction. Drag reducing device 252 also includes a rounded face portion and is sized to fit between the panels 118.

Of course, drag reducing devices 250 and 252 may be positioned or mounted in a similar manner as noted above with respect to devices 130 (e.g., fasteners, adhesives, tapes, frames), and should not be limiting.

FIGS. 5 and 26 show several examples of drag reducing devices that may be provided on the front face of the locomotive 102 that are in accordance with embodiments of the present invention. The shapes and number of devices to be applied to the locomotive 102 should not be limited to those described.

Figure 6:
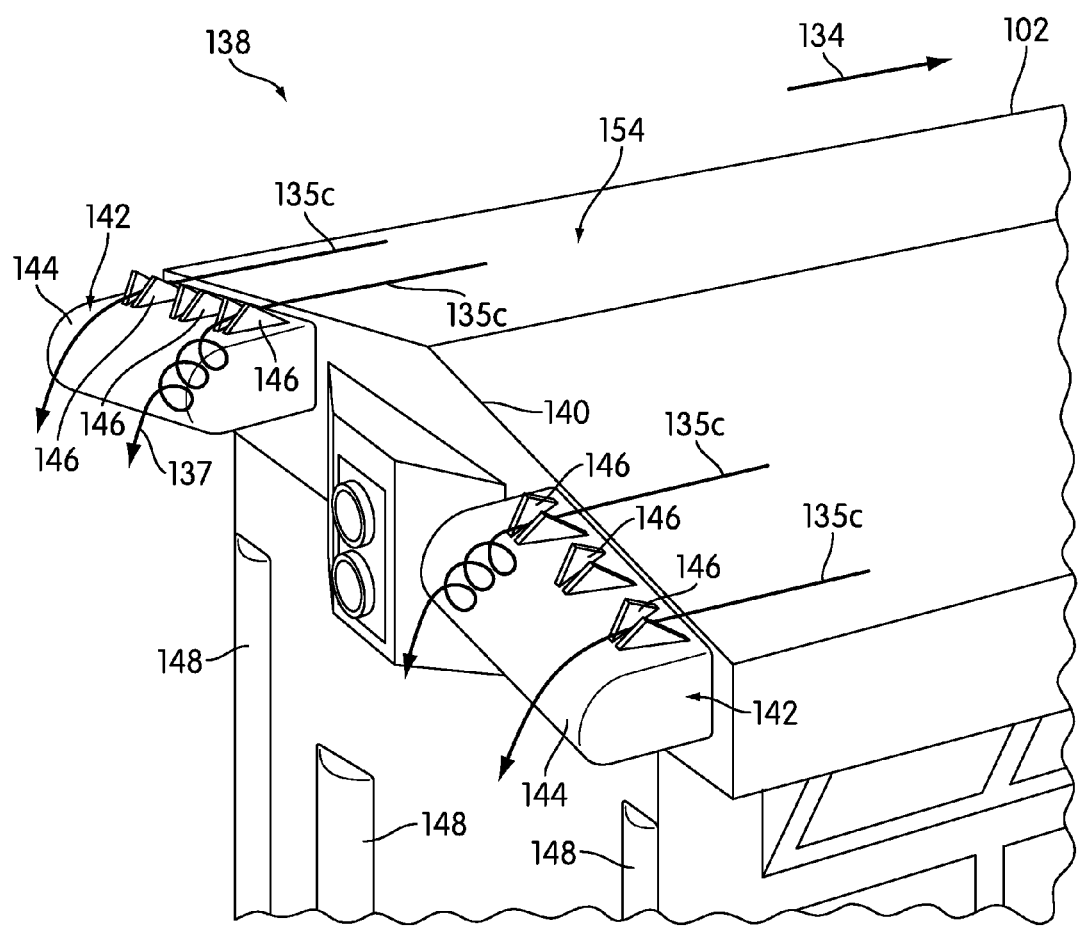
FIG. 6 illustrates a detailed perspective view of a back end of the locomotive with aerodynamic drag reducing devices thereon in accordance with an embodiment of the present invention.

FIG. 6 illustrates a detailed perspective view of the opposite or back end 138 of the locomotive 102 with aerodynamic drag reducing devices 142 and 148 thereon in accordance with an embodiment of the present invention. In some cases, the back end 138 of the locomotive 102 of FIG. 6 may represent a radiator cab 102*c* or other compartment, for example. As shown, the devices 142 are generally designed as extensions to be applied to the back end 138 or rear bluff face near the roof 154 of the locomotive. The devices 142 are provided to prevent drag at the end 138 caused by air flow when the train 100 is moving. For example, as the train 100 is moving along the track 103 and air flows around the body of the locomotive, a suction effect may be created at the back face or back end 138. The devices 142, therefore, are provided to reduce and/or eliminate such drag effects.

The devices 142 comprise a first side and a second side. For example, the first side may comprise a fairing 144 of a rounded or radiussed construction, and a second side for mounting of a substantially flat construction (so that the device 142 may be attached flush to the back face, for example).

In some embodiments, the aerodynamic drag reducing devices 142 may comprise a curved fairing surface 144 and at least one pair of winglets 146 for assisting in directing movement of air when the locomotive is in motion. The winglet pairs 146 may comprise a first and second angled section, referred to as a winglet, which are provided on a top surface of the fairings 144 of each of the devices 142. In some cases, the winglets in the winglet pairs 146 are mounted at an angle relative to each other to assist in directing air (as shown by arrows 135*c*) at the back end 138 or face of the locomotive 102 such that a laminar flow is provided and suction and/or drag effects are reduced. The winglets of each winglet pair 146 may be mounted at an angle relative to each other such that a distance between proximal ends of the winglets (e.g., the ends closer to the rounded edge of the fairing 144) is smaller than a distance between distal ends of the winglets (e.g., the ends closer to the back face). In some embodiments, such as represented by arrow 135*c*, the winglet pairs 146 are positioning such that they assist in creating vortices, as noted by element 137, to bend or swirl air with the rounded fairing surfaces 144 of the devices 142. In some embodiments, each winglet of the winglet pair may be mounted at a fifteen (15) degree taper with respect to the rear or back end 138. In some embodiments, the winglets may be mounted at any angle which induces laminar flow toward the back end 138 of the locomotive 102.

Also illustrated in FIG. 6 are aerodynamic drag reducing devices 148, which are applied as trim pieces. These devices 148 also comprise a fairing with a radius to smooth air flow around rear corners of the cab or body, and to facilitate directing the air flow to break off at the rear nose/face to reduce corner vortices and further assist in providing a substantially laminar flow of air along the body of the locomotive 102. The aerodynamic drag reducing devices 148 may be applied to a number of locations of the rear face of the back end 138. For example, as shown, the devices 148 may be applied in a vertical configuration to edges or corners of the back end 138, or in a middle portion of the back face.

In some embodiments, the devices 148 may comprise a first side of substantially rounded construction, and a second side of substantially flat construction. For example, the first side may provide the fairing portion for directing or redirecting air movement (as represented by arrow 135), and the second side may be used for attaching the devices to the surfaces of the locomotive, such as described above with respect to devices 130.

Figure 14A:
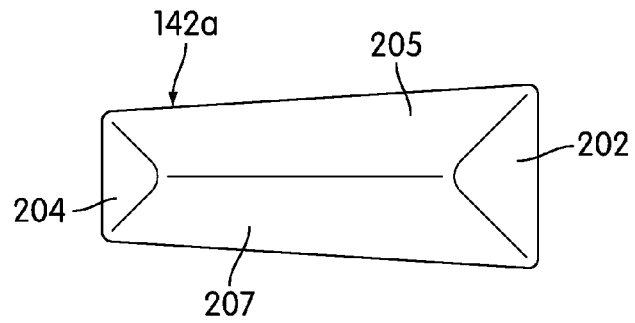
FIG. 14a illustrates a detailed view of an alternate aerodynamic drag reducing device in accordance with an embodiment of the present invention.
Figure 14B:
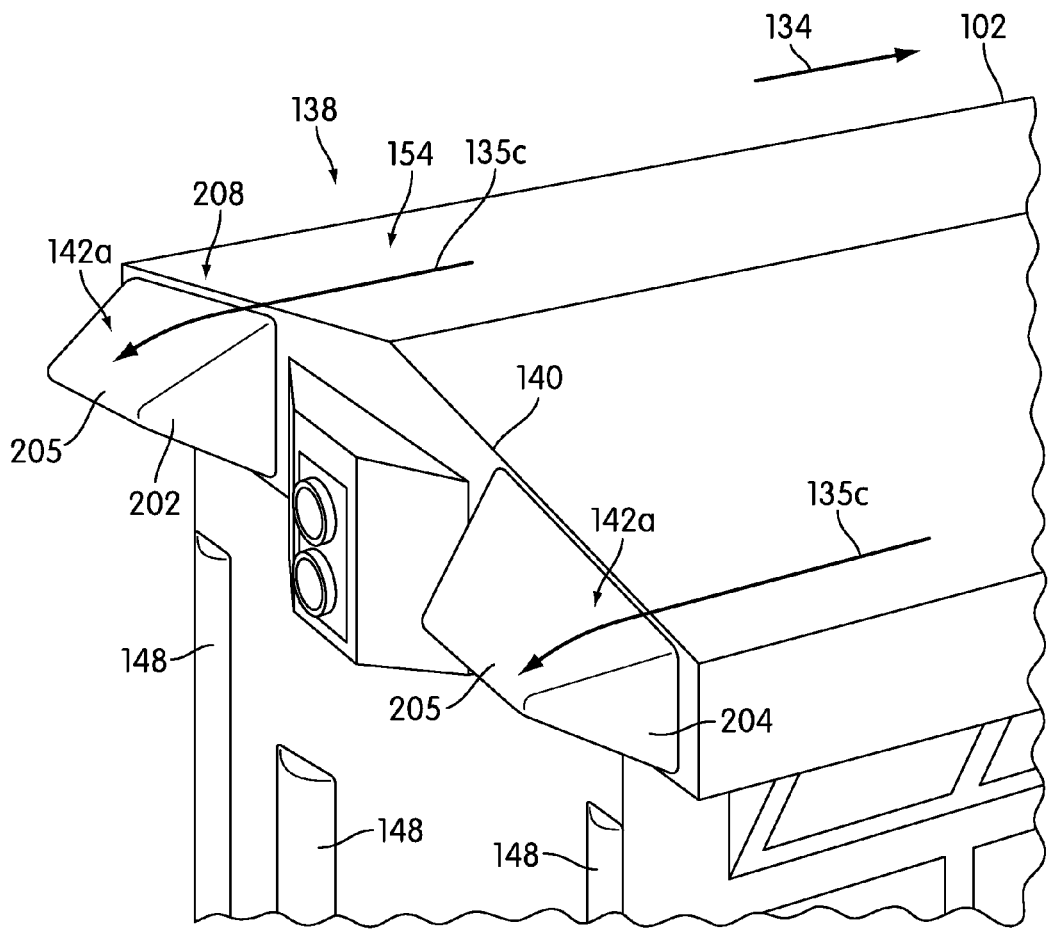
FIG. 14b illustrates a detailed perspective view of a back end of the locomotive with the alternate aerodynamic drag reducing devices as shown in FIG. 14a thereon in accordance with an embodiment of the present invention.

FIGS. 14*a* and 14*b* illustrate a detailed and perspective view of an alternate aerodynamic drag reducing device 142*a* that may be used on the back end 138 of a locomotive 102 also in accordance with an embodiment of the present invention. As shown, the devices 142*a* are generally designed as extensions to be applied to the back end 138 or rear bluff face near the roof 154 of the locomotive. The devices 142*a* are provided to assist in directing air (as shown by arrows 135*c*) at the back end 138 or face of the locomotive 102 such that a laminar flow is provided and suction and/or drag effects are reduced when the train 100 or locomotive 102 is moving. The devices 142*a* comprise a front side and a back side. For example, the front side may comprise a fairing of a rounded or radiussed construction, and a back side for mounting of a substantially flat construction (so that the device 142*a* may be attached flush to the back face, for example). More specifically, in some cases, the back end 138 of the locomotive 102 (or radiator cab 102*c*) may comprise a roof 154 with sloped edges 208. The devices 142*a* shown in detail in FIG. 14*a* are designed according to such edges 208, for example.

The devices 142*a* comprise a first side 202 and a second side 204 joined by a top portion 205 and a bottom portion 207. Each device 142 may comprise a tapered construction that is angled based on the sloped edges 208 of the locomotive 102. For example, as shown in the detailed view of FIG. 14, the first side 202 of the device 142*a* may comprise a larger height that extends vertically with respect to the height of the edge of the locomotive. The second side 204 may comprise a smaller height with respect to the first side 202 that extends vertically with respect to the outer edge of the locomotive. The sides 202, 204 and top and bottom portions 205, 207 may form a fairing of a rounded or radiussed construction. Each of the surfaces may be curved so as to further reduce drag and shedding vortices that may be formed as the locomotive 102 is moved in a forward direction.

Additionally, as noted above, the dimensions of devices 142, 142a, and 148 should not be limiting. The devices 142, 142a, and 148 may be retrofit such that they comprise a configuration formed according to the specifications of the locomotive 102 and the elements provided on its back face, for example.

Aerodynamic drag reducing devices 142, 142a, and/or 148 may be attached in any number of ways. For example, in some embodiments, it is envisioned that the devices 142, 142a, and/or 148 are attached using securement methods including, but not limited to, adhesives and fasteners as known in the art. In some embodiments, industrial strength adhesive structural foam tape, or conventional threaded fasteners may be used to attach the devices 142, 142a, or 148. For example, the devices 142, 142a, or 148 may be retrofit and applied to the locomotive using a two-sided or dual-sided structural tape. In some cases, the second side of both/either of the devices 142, 142a, and/or 148 comprise a device for mounting. In some embodiments, drag reducing devices 142, 142a, and/or 148 further comprise an attachment frame that is use to assist in mounting the devices on the locomotive. Other securement devices such as threaded fasteners or bolts may also be used for attachment or mounting.

Figure 7:
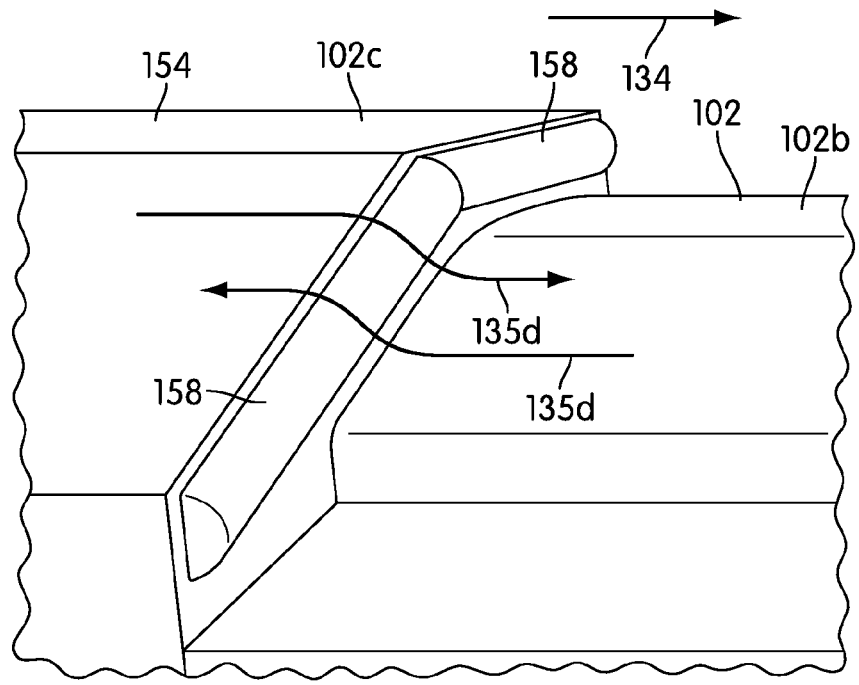
FIGS. 7 and 8 illustrate detailed perspective views of part of a locomotive with aerodynamic drag reducing devices attached thereto in accordance with an embodiment of the present invention.
Figure 8:
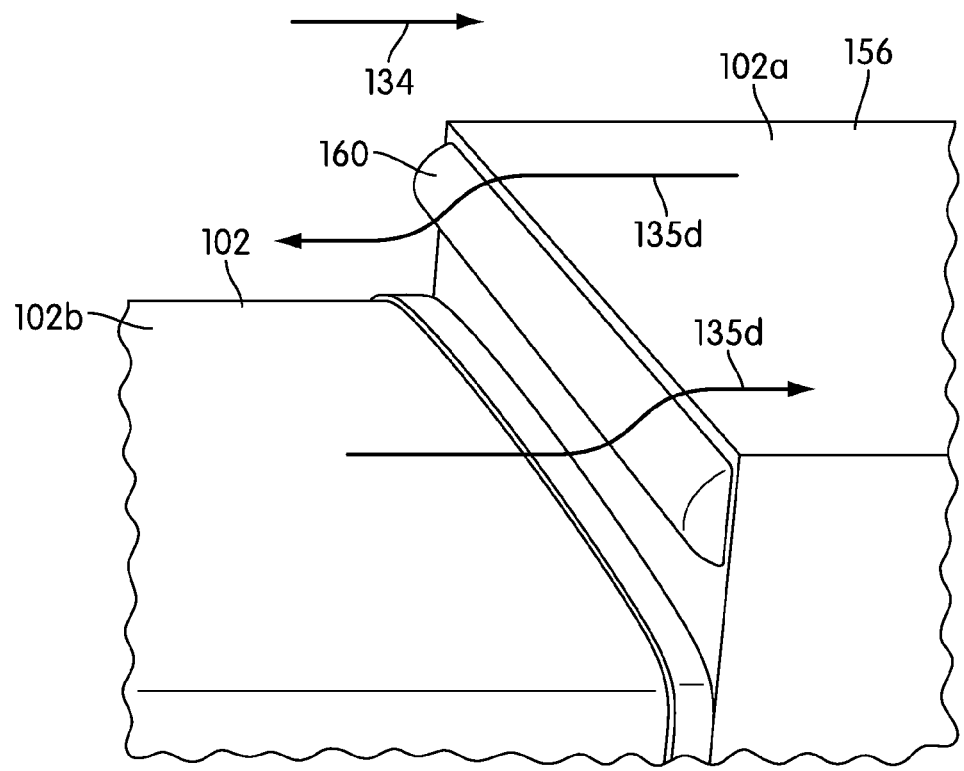

Further, FIGS. 7 and 8 illustrate detailed perspective views of yet another part of a locomotive 102 with aerodynamic drag reducing devices 158 and/or 160 attached thereto in accordance with an embodiment of the present invention. For example, the views as shown in FIGS. 7 and 8 may correspond to a middle compartment or section whose height is reduced (see, e.g., FIG. 2). Thus, FIG. 7 may correspond to an area located near the back end 138 of the locomotive, and FIG. 8 may correspond to an area located near the front end 109 of the locomotive. Alternatively, the views may correspond to a part of one or more cabs 102a-102c having one or more edges associated therewith. As such, the location of the described edges and drag reducing devices 158, and 160 should not be limiting, so as long as they are mounted to one or more sections associated with the locomotive 102.

The aerodynamic drag reducing devices 158 and 160 of FIGS. 7 and 8 may comprise a fairing as similarly described with respect to the devices 130 on the corners 128 of the front face 116 or the rear trim pieces 148. That is, the devices 158 and/or 160 may each comprise a fairing having a radiussed or rounded shape on a first side (e.g., for directional air movement), and a substantially flat second side (e.g., for attachment). The devices 158 or 160 may be added to edges associated with any part of the locomotive 102, as shown. In some cases, as shown in FIG. 7, a plurality of devices 158 may be mounted at an angle with respect to each other, for example. The devices 158 and/or 160 may be of retrofit construction according the specifications for each of the locations for mounting.

FIGS. 9-12b illustrate the locomotive 102 comprising an alternate system of aerodynamic drag reducing devices in accordance with other embodiments of the present invention. Locomotive 102 may include like features and drag reducing devices as described above with respect to the embodiments of FIGS. 1-8. More specifically, the same reference numerals which represent these similar features are used in FIGS. 9-12b (as well as in FIGS. 13-22). Of course, none, some or all of the noted aerodynamic devices may be provided on the locomotive 102 in combination with the disclosed embodiments.

In this embodiment, a plurality of aerodynamic drag reducing devices may be provided on the locomotive 102 to assist in reducing the amount of drag of a moving train 100 using separately mountable assemblies. That is, in addition to the drag reducing devices, FIGS. 9-12b also illustrate an example of mounting assemblies which may be used to mount aerodynamic drag reducing devices 150 and 162 to the locomotive 102.

Figure 9:
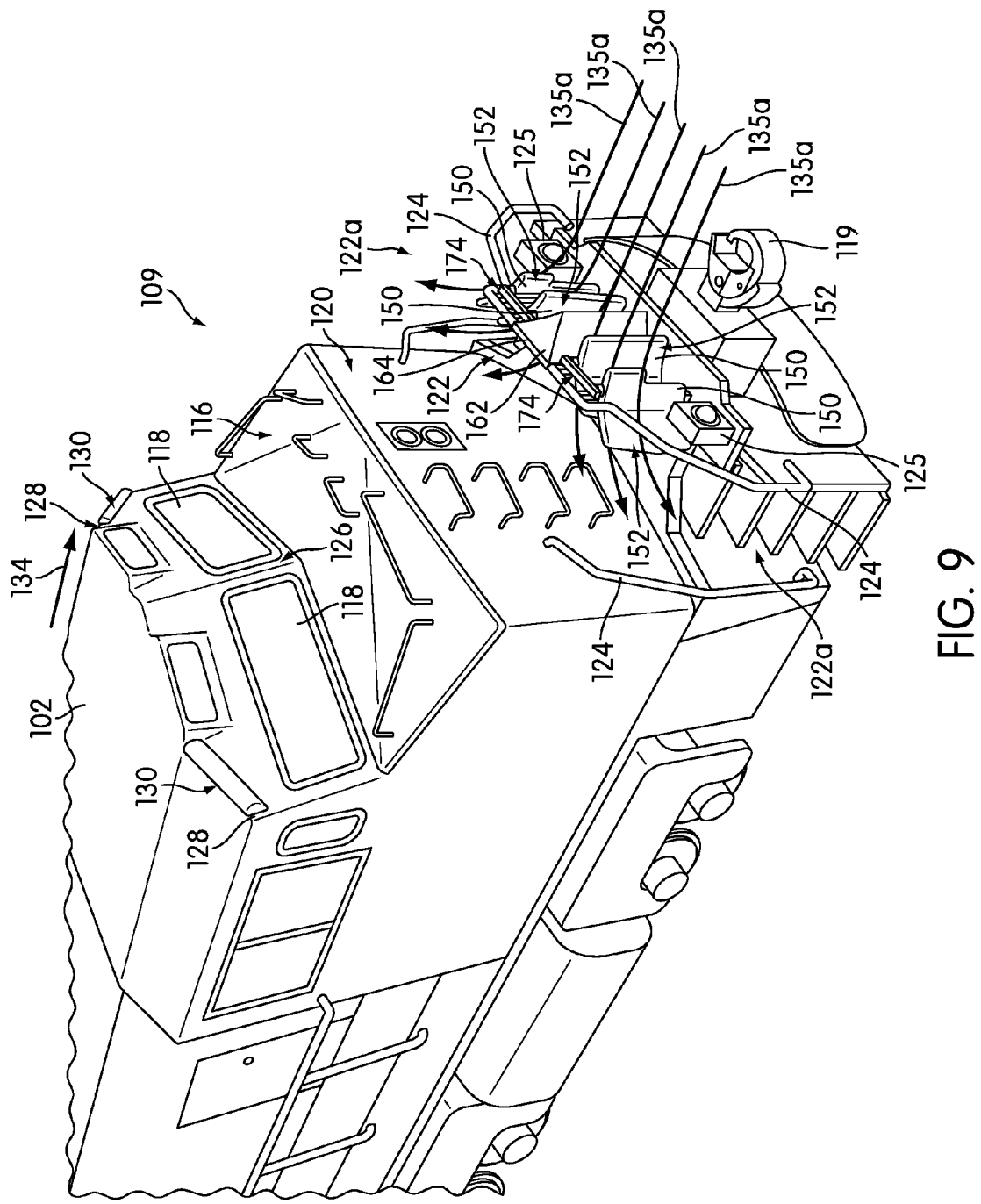
FIG. 9 illustrates the train of FIG. 1 comprising an alternate system of aerodynamic drag reducing devices on the locomotive in accordance with an embodiment of the present invention.

Each aerodynamic drag reducing device 130, 150, and 162 comprises a drag reducing fairing configured to reduce aerodynamic drag when the locomotive 102 is in motion (e.g., moving forward). The plurality of drag reducing devices may be configured to be mounted to the locomotive using assemblies that are associated with a predetermined location on the locomotive. In this case, the devices shown in FIG. 9 are provided on the front end 109 of the locomotive to reduce the aerodynamic resistance as noted above with respect to FIGS. 2-8.

Specifically, this embodiment includes a center mounted aerodynamic drag reducing device 162 and a plurality of aerodynamic drag reducing devices 150 which may be mounted to the front of the locomotive 102. The center mounted aerodynamic drag reducing device 162 is designed to be mounted to a center location on the front end 109 with respect to the front face 116 of the locomotive 102. In some cases, the handrail 124 may have an open configuration or area in which the center mounted aerodynamic drag reducing device 162 may be mounted. Drag reducing device 162 may be placed in such an area, as shown in FIG. 9, or attached to a front portion of the handrail 124. In any case, the center mounted aerodynamic drag reducing device 162 may comprise a wedge-shaped configuration substantially similar to that of a triangular prism with curved sides. That is, the device may comprise a polyhedron shape made of a substantially triangular base and top portion connected by 3 substantially rectangular sides designed to reduce drag. In an embodiment, at least two of the rectangular sides of the triangular prism device may comprise curved configurations which concave away from the locomotive body. That is, the side surfaces may be angled or curved so as to direct air away from a centerline of the locomotive 102. The third side (e.g., the back side) may comprise a substantially rectangular shape, and may be curved or substantially straight. Alternatively, a third side need not be provided.

The drag reducing device 162 may be designed such that its dimensions allow for its sides to vertically extend from a top deck of the walkway 122 to the handrail 124. In some cases, the dimensions of the device 162 may be such that they correspond to dimensions associated with the locomotive 102 and its features (e.g., the dimensions of the handrail 124, walkway 122, spaces in the handrail, etc.). Device 162 may comprise a length, width, and/or height such that it may be mounted or attached to or between vertical and horizontal members of the handrail 124. The dimensions of device 162 should not be limiting. However, the device 162 may also be designed or positioned such that it does not interfere with the walkway 122 or platform or deck area itself or the leading edge thereof. For example, the sides of the device 162 may be sized and positioned such that it does not obstruct lateral passage on the walkway 122 and also not to interfere with use of the coupling 119 on the front end 109 of the locomotive 102.

Generally, the center mounted aerodynamic drag reducing device 162 is mounted with respect to the drag reducing devices 150 which are also mounted adjacent walkway 122, as noted above. The devices 150 comprise similar curved configurations that are positioned or angled at a angle to assist in directing airflow as noted in the embodiments above. The combination of devices 150 and 162 is mounted and positioned in such a manner so as to redirect or deflect air flow in a controlled manner away from the front nose 120 and towards the sides of the locomotive, as represented by arrows 135*a*, during movement or travel. Each device 150 is angled with respect to a centerline of the locomotive. The side surfaces of the center drag reducing device 162 may also be angled or curved with respect to a centerline of the locomotive.

In the illustrated embodiment, the devices 150 and 162 are mounted generally vertically to one or more members of the handrail(s) 124. For example, the devices 150 may be mounted such that each device 150 extends outwardly and towards the body of the locomotive from a distal edge thereof to a proximal edge thereof. As shown in the drawings, two devices 150 are provided on a first side (e.g., the right side) of the handrail 124 and two devices 150 are provided on a second side (e.g., the left side) of the handrail 124. Of course, any number of devices 150 may be provided on the handrail 124. As better shown in FIG. 12*a*, an open space or section is provided in the center of the handrail 124 near the centerline of the locomotive 102. The center mounted aerodynamic drag reducing device 162 may be mounted in this space or section so as to further assist in redirecting the airflow when the train 100 is in motion.

The devices 150 and 162 may be attached or mounted to the walkways 122, handrails 124, or a location adjacent thereto (e.g., platform) in any number of ways. For example, the plurality of aerodynamic drag reducing devices 150 and 162 may be mounted to the locomotive using mountable frame assemblies 164 and 174, as shown in detail in FIGS. 10 and 11, respectively.

Figure 10:
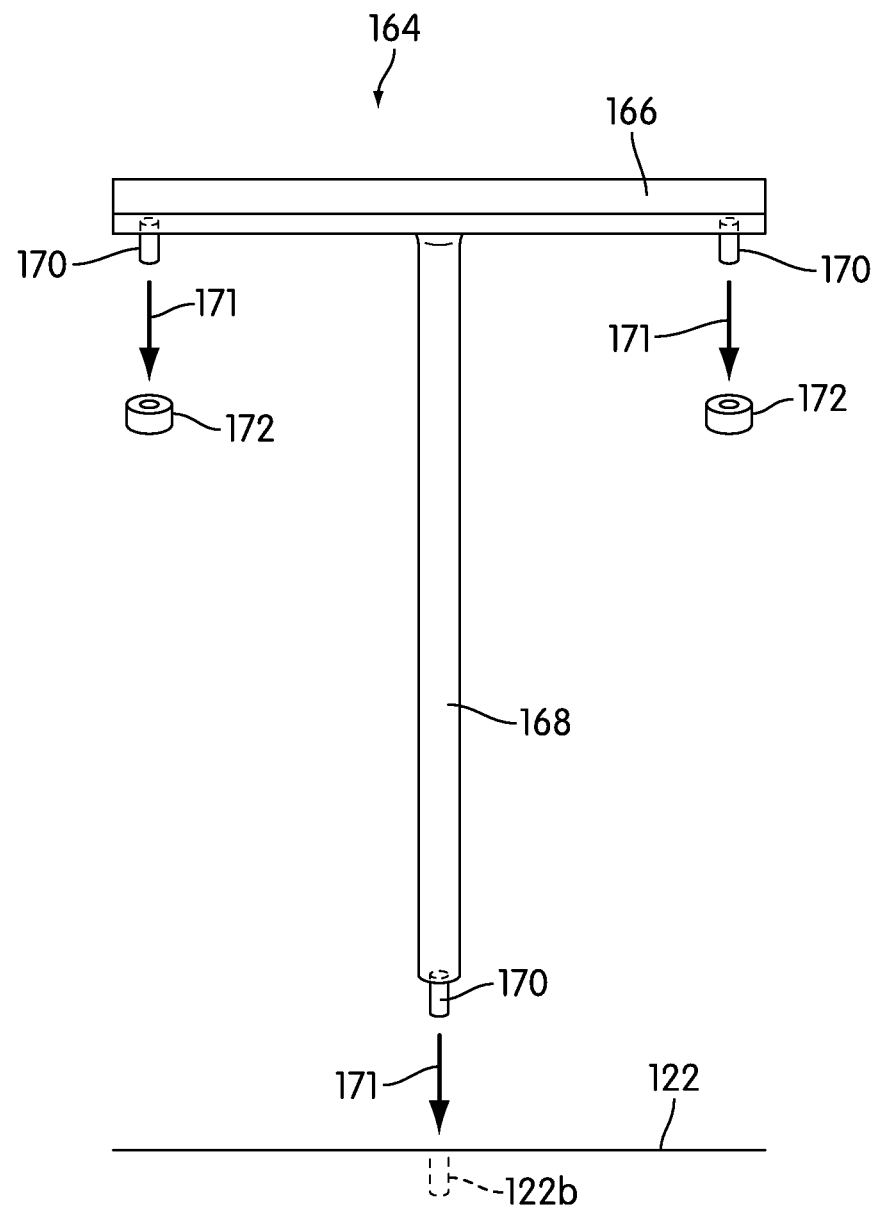
FIG. 10 illustrates a mountable frame assembly for attaching one of the aerodynamic drag reducing devices of FIG. 9 to the locomotive in accordance with an embodiment of the present invention.

FIG. 10 illustrates a mountable frame assembly 164 for attaching one of the aerodynamic drag reducing devices (i.e., the center mounted drag reducing device 162) to the front end 109 of the locomotive 102 in accordance with an embodiment of the present invention. In this case, the mounting assembly 164 is designed to be attached between a right and a left side of the handrail 124. However, the same mountable frame assembly 164 may be used to attach the device 162 to a handrail 124 that extends across the front end 109 of the locomotive 102 (i.e., that has no break, space, or open section). In any case, the mountable frame assembly 164 generally comprises a "T"-shaped support for supporting and mounting the center device 162.

The "T"-shaped support 164 comprises at least a horizontally positioned top frame piece 166 and a vertically positioned bottom frame piece 168 extending perpendicularly from a center area of the horizontally positioned frame piece 166. The top frame piece 166 and bottom frame piece 168 may be formed from 2 inch square tubes, for example. The pieces 166 and 168 may be welded together, adhered together, molded, or formed as a unitary structure in any number of ways. Though not shown, additional supporting pieces may also be provided that extend from one or more of the horizontal and/or vertical pieces 166, 168. The drag reducing device 162 itself (e.g., its sides and back) is attached to the "T"-shaped mountable frame assembly 164 using conventional means and should not be limiting. For example, the device 162 may be attached to the frame assembly 164 via adhesive or fastening (e.g., bolts, nuts) devices. As another example, the drag reducing device 162 may comprise a vertical bore (e.g., similar to the openings 150*a* shown in FIG. 11 in the drag reducing devices 150) that extends the length of the device such that the vertically positioned bottom frame piece 168 may be inserted therethrough.

The "T"-shaped mountable frame assembly 164 and thus the center aerodynamic drag reducing device 162 may be mounted to the handrail 124 on the front end 109 via connection devices. For example, small pins 170 or bars may be provided on either end of the horizontally positioned top frame piece 166 and at a bottom of the vertically positioned frame piece 168, as shown in FIG. 10. Such pins 170 may comprise a one-half inch round bar, for example. The pins 170 of the horizontally positioned piece 166 may be designed to be inserted (e.g., downwardly as shown by arrows 171) into support tubes 172 provided on the handrail 124, for example. The support tubes 172 are provided for attachment of the frame assembly to the handrail. The support tubes 172 generally comprise a round shape and an opening therethrough. The support tubes 172 may comprise, for example, approximately a 1 inch inner diameter and a length of approximately 2 inches. The dimensions of the support tubes 172, however, should not be limiting.

The pin 170 of the vertically positioned piece 168 may be inserted (e.g., downwardly as shown by arrow 171) into an opening or hole 122*b* of the walkway 122. The opening or hole 122*b* may be previously present or formed (e.g., by a worker) in the platform of the walkway 122 for the purpose of mounting the device 162. The opening 122*b* may be configured to be slightly larger, e.g., ⅝ of an inch, than the pin 170 (½ inch), so as to easily receive the pin 170 of the bottom piece 168 therein. In some cases, the pins 170 may be secured in the opening 122*b* or support tubes 172 via securement devices (not shown). Further details regarding mounting the assembly 164 onto the locomotive 102 are provided below in the description of FIGS. 12*a* and 12*b*.

Figure 11:
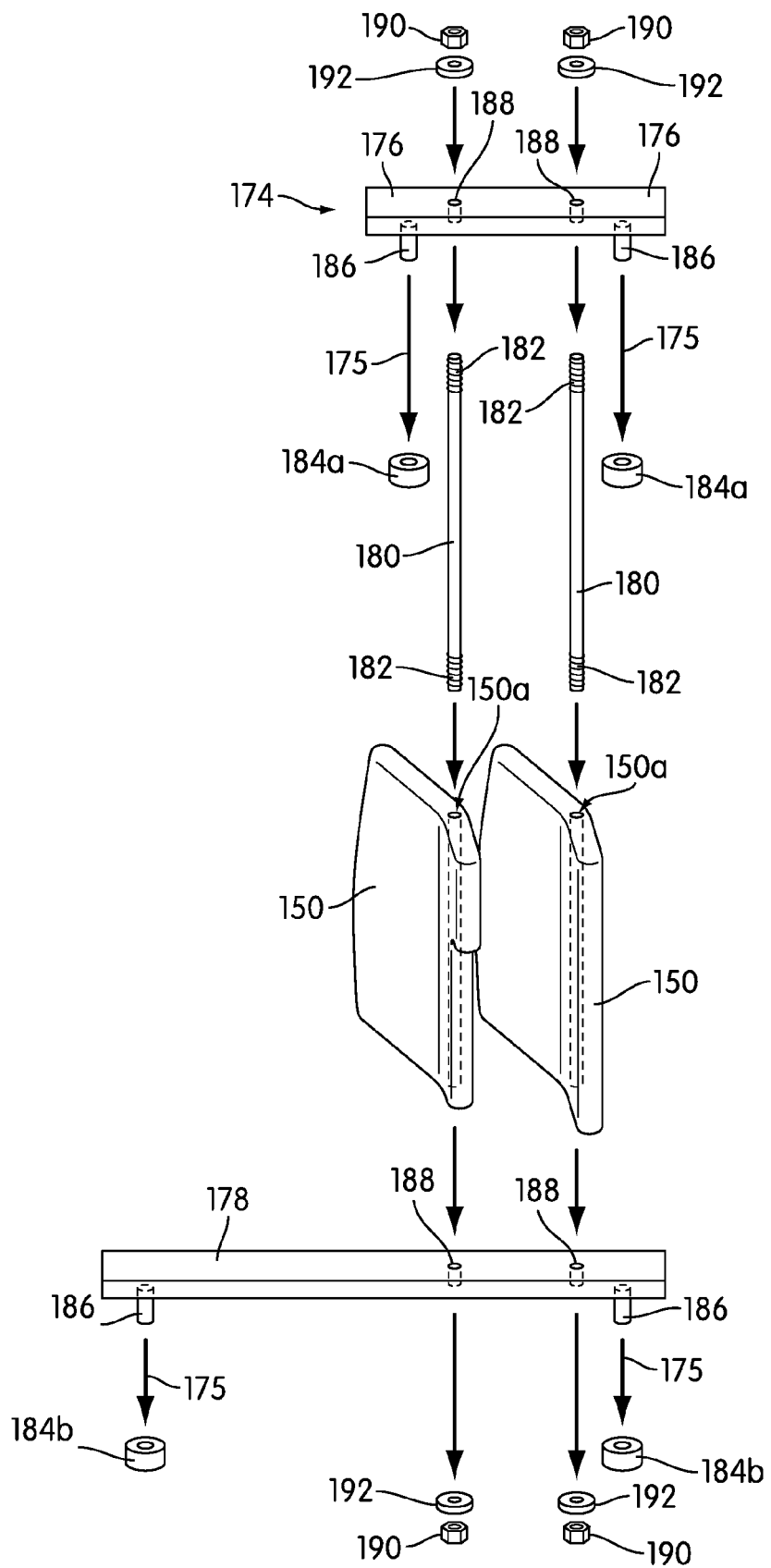
FIG. 11 illustrates another mountable frame assembly for attaching a plurality of aerodynamic drag reducing devices of FIG. 9 to the locomotive in accordance with an embodiment of the present invention.

FIG. 11 illustrates a mountable frame assembly 174 for attaching a plurality of aerodynamic drag reducing devices 150 to the front end 109 of the locomotive 102 in accordance with an embodiment of the present invention. In this case, the mountable frame assembly 174 is designed to position two drag reducing devices 150 on a left side of the handrail 124. However, the mountable frame assembly 174 may be used to attach any number of devices 150 to a handrail 124 and should not be limiting. Furthermore, it is to be understood that a symmetrically similar mounting assembly 174 is to be formed and provided on a right side of the handrail 124. FIG. 12*b* illustrates an example of the right and left mounting assemblies 174 for the drag reducing devices 150. Additionally, it is to be understood that the dimensions (e.g., lengths) of the parts of the mountable frame assembly 174 should not be limited to those shown.

In some cases, the mountable frame assembly 174 may be designed to extend across the entire handrail 124 on the front end 109 of the locomotive 102 (e.g., so as to hold and mount a plurality of devices 150 across its front). The mountable frame assembly 174 generally comprises a top horizontal cross arm portion 176 and a bottom horizontal cross arm portion 178 spaced apart and in a substantially parallel direction with respect to each other. The assembly also comprises two vertically extending rods 180 for positioning the drag reducing devices 150. The rods 180 comprise a top and bottom ends may have threads 182 thereon. Thus, in some embodiments, the threaded ends 182 of the top of the rods 180 may be configured to be threaded into holes 188 of the top horizontal cross arm portion 176, and the threaded ends 182 of the bottom of the rods 180 may be configured to be threaded into holes 188 of the bottom horizontal cross arm portion 178. Of course, threads 182 need not be provided.

In an embodiment, each rod 180 may be configured to be inserted into an aerodynamic drag reducing device 150 via elongated openings 150*a* that is provided in the drag reducing device 150. For example, as shown in detail in FIG. 11, an elongated hole 150*a* may be provided vertically within the body of the device 150. The rods 180 may be inserted through the devices 150, and the mounting assembly 174 may be assembled to secure the devices 150 by attaching the ends 182 of the rods in the corresponding holes 188 of the top and bottom horizontal cross arm portions 176 and 178. The rods 180 may be secured in or through each hole 188 of the portions 176 and 178 via washers 192 and fastening nuts 192, for example.

One non-limiting advantage of using a rod 180 through a drag reducing device 150 is that it not only allows for vertical mounting of the device 150, but it also allows for positioning of the device at an angle so that the device 150 can extend outwardly and towards the body of the locomotive. For example, the device 150 may be rotated about a vertical axis of the rod 180 and the angle at which the concave and convex portions of the device 150 may be adjusted.

Mountable frame assembly 174 and thus a plurality of aerodynamic drag reducing devices 150 may be mounted to the front end 109 of the locomotive 102 via connection devices. For example, similar support tubes 184a and 184b and pins 186 as described in FIG. 10 may be provided. Small pins 186 or bars may be provided on either end of the horizontally positioned top horizontal cross arm portion 176 and bottom horizontal cross arm portion 178 as shown in FIG. 11. Such pins 186 may comprise a one-half inch round bar, for example. The pins 186 of the horizontally positioned portions 176 and 178 may be designed to be inserted (e.g., downwardly as shown by arrows 175) into support tubes 184a or 184b provided on the handrail 124 or in some location on the front end 109 of the locomotive 102, for example. In some cases, the pins 170 may be secured in the support tubes 184a and/or 184b via securement devices (not shown). Further details regarding mounting the assembly 174 onto the locomotive 102 are provided below in the description of FIGS. 12a and 12b.

As can be seen in FIG. 11, in some cases the bottom horizontal portion 178 may be designed to comprise different dimensions than the top horizontal portion 176. The dimensions of parts of the mountable frame assembly 174 may be such that they correspond to dimensions associated with the locomotive 102 and its features (e.g., the dimensions of the handrail 124, walkway 122, spaces in the handrail, etc.). For example, each of the rods 180 may comprise a length and/or height such that it may be mounted or attached to an aerodynamic drag reducing device 150, while still considering its dimensions in relation to vertical members 124a of the handrail 124. Additionally, the top horizontal cross arm portion 176 may be mounted to a top part of the handrail 124 (or handrail members 124a), while the bottom horizontal cross arm portions 178 may be configured to be mounted to the handrails and one or more objects of the locomotive (e.g., a headlight or spotlight 125). As such, in some embodiments, the dimensions (e.g., length) of the portions 176 and 178 may differ based on mounting locations and locomotive features. Thus, the dimensions of assembly 174 should not be limiting.

It should be noted that the mountable frame assemblies 164 and 174 and their respective sections and pieces may be formed from any number of materials. For example, the horizontal and/or vertical frame members 166, 168, 176, 178, and/or 180 may be formed from known materials such as metals (e.g., steel) or plastics. Also, although in some cases the parts are referred to as bars, tubes, and the like, the shape of the pieces (e.g., square, round) used in the mounting assemblies 164 and 174 should not be limiting. Furthermore, any size or number of pieces may be used to reinforce as well as position and/or mount the devices 150 and 162 to the locomotive 102.

Figure 12A:
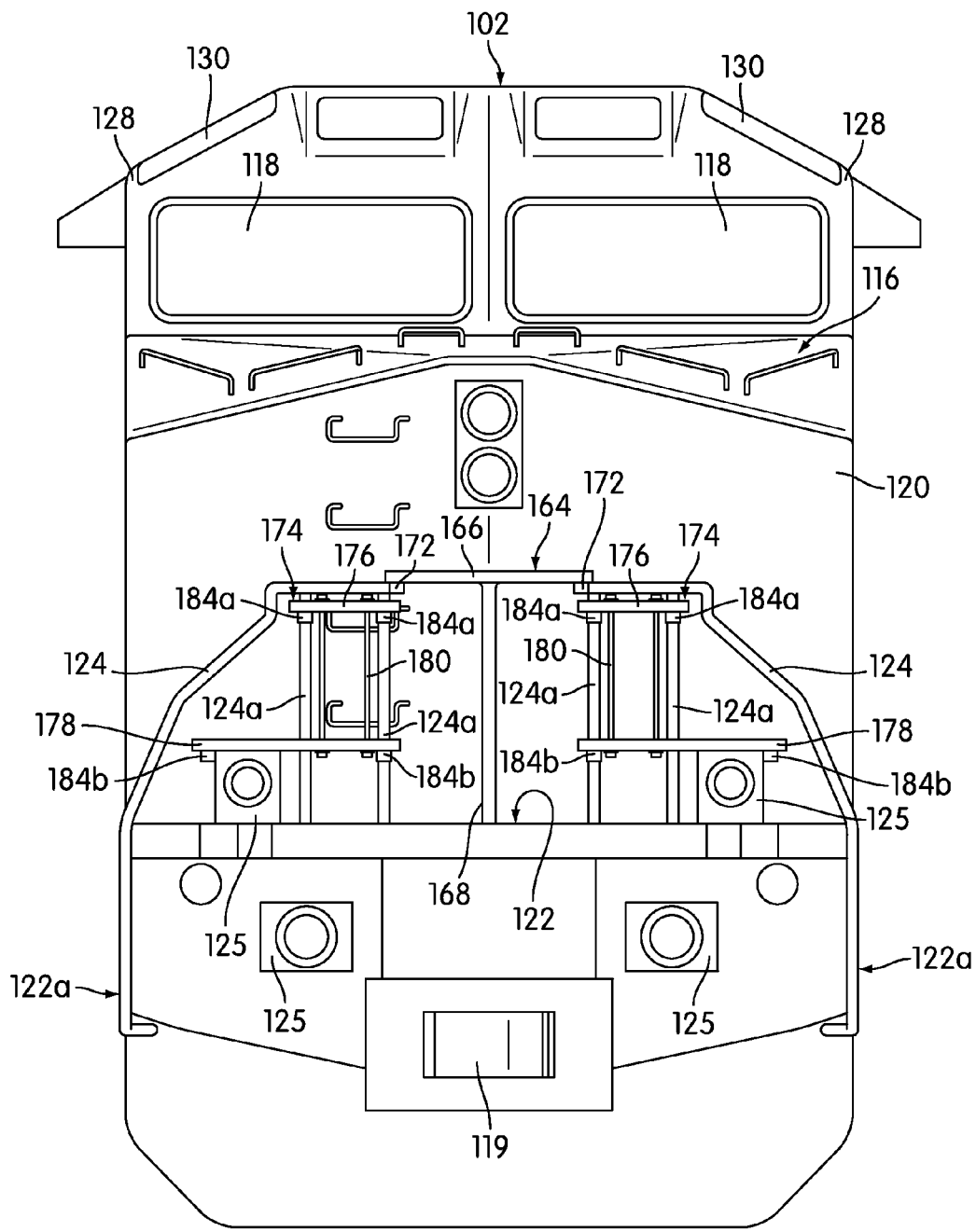
FIG. 12a illustrates a front view of a front end of the locomotive having the mountable frame assemblies of FIGS. 10 and 11 attached thereto in accordance with an embodiment of the present invention.
Figure 12B:
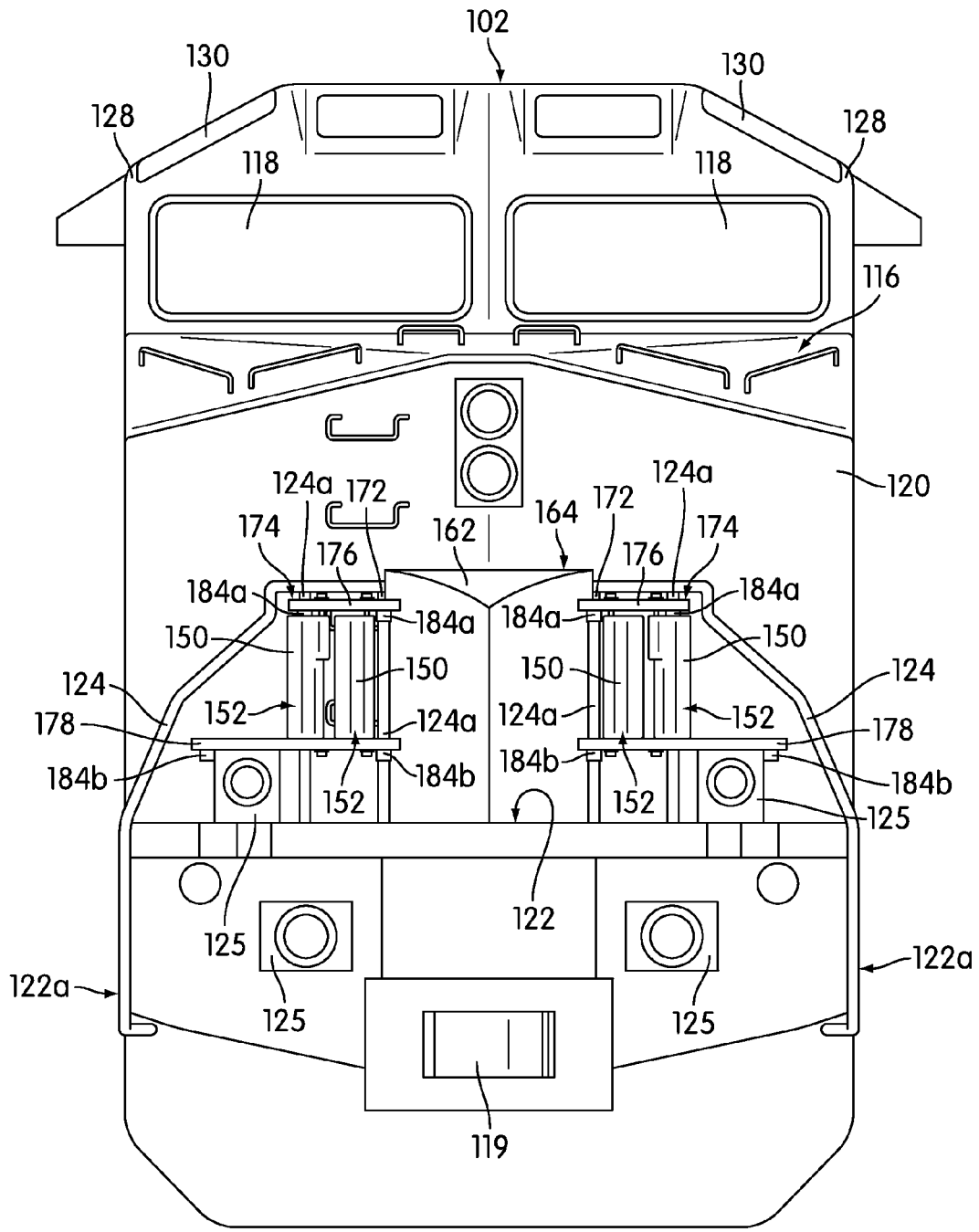
FIG. 12b illustrates a front view of the front end of the locomotive of FIG. 9 with the aerodynamic drag reducing devices in accordance with an embodiment of the present invention.

FIGS. 12a and 12b illustrate detailed views of an example of how the aerodynamic drag reducing mounting assemblies 164 and 174 and their respective devices 150 and 162 are attached to a front end 109 of a locomotive 102. For illustrative purposes only, FIG. 12a illustrates the attachment of the mounting assemblies to vertical and horizontal members 124a or stanchions of the handrails 124 without the drag reducing devices 150, 162 or fairings thereon. For example, FIG. 12a illustrates positions for mounting support tubes 172, 184a, and 184b to the horizontal and vertical stanchions of the handrail 124. In an embodiment, the support tubes 172, 184a, and 184b may be welded to positions corresponding to the dimensions of the aerodynamic drag reducing devices 150 and 162 such that the openings of the support tubes are positioned in line with a vertical axis. For example, support tubes 172 may be welded to ends of the right and left sides of the handrail 124 so that the "T"-shaped support assembly 164 may be mounted in the open space or section of the handrail 124 by inserting the vertical extending pins 170 downwardly as shown by arrow 171 in FIG. 10 into the tubes 172. The end of the vertically positioned frame 168 is secured in the opening 122b in the walkway 122. Similarly, support tubes 184a may be welded to a top portion of the vertical members 124a of the handrail 124. In this case, the support tubes 184 are provided on a front face of the handrail members 124a.

The support tubes 184b may be welded to a bottom or lower portion of the vertical members 124a. In some cases, one or more support tubes 184b may be welded to alternate objects on the front end 109 of the locomotive 102. For example, as shown in FIG. 12a, support tubes 184b may be mounted on a part of the headlights or spotlights 125 of the locomotive. As such, the bottom horizontal cross arm portion 178 comprises a longer length than the top horizontal cross arm portion 176 such that its pins 186 may be properly positioned in the support tubes 184b. The mounting assembly 174 is mounted by inserting the pins 186 downwardly as shown by arrow 175 in FIG. 11 into the support tubes 184a and 184b. FIG. 12b illustrates a front view of the front end 109 of the locomotive 102 with the aerodynamic drag reducing devices 150 and 162 mounted thereon via the assemblies 164 and 174.

In some cases, the assemblies 164, 174 and/or devices 150 and 162 may be configured such that they are mounted to include clearances (e.g., as required by standards or for convenience purposes). For example, the mountable frame assemblies 164 and 174 may provide clearances up to and including approximately 4 inches between the devices 150 and handrails 124 and walkways 122, for example.

Again, the devices 150 may be mounted at a plurality of angles with respect to the centerline of the locomotive 102. The angle for positioning each of the devices may be oriented based on the walkway 122 specifications of the locomotive 102, for example. In some cases, each of the devices 150 may be provided at similar angles. In some cases, each of the devices 150 may be provided at different angles.

FIGS. 15-21 illustrate the locomotive 102 comprising yet another alternate system of aerodynamic drag reducing devices 162a and 210 in accordance with other embodiments of the present invention. Locomotive 102 as shown in FIGS. 15-21 may include like features and drag reducing devices as described above with respect to the embodiments of FIGS. 1-8 and 9-12b. More specifically, the same reference numerals which represent these similar features are used in FIGS. 15-21. Of course, none, some or all of the noted aerodynamic devices may be provided on the locomotive 102 in combination with the disclosed embodiments.

Figure 15:
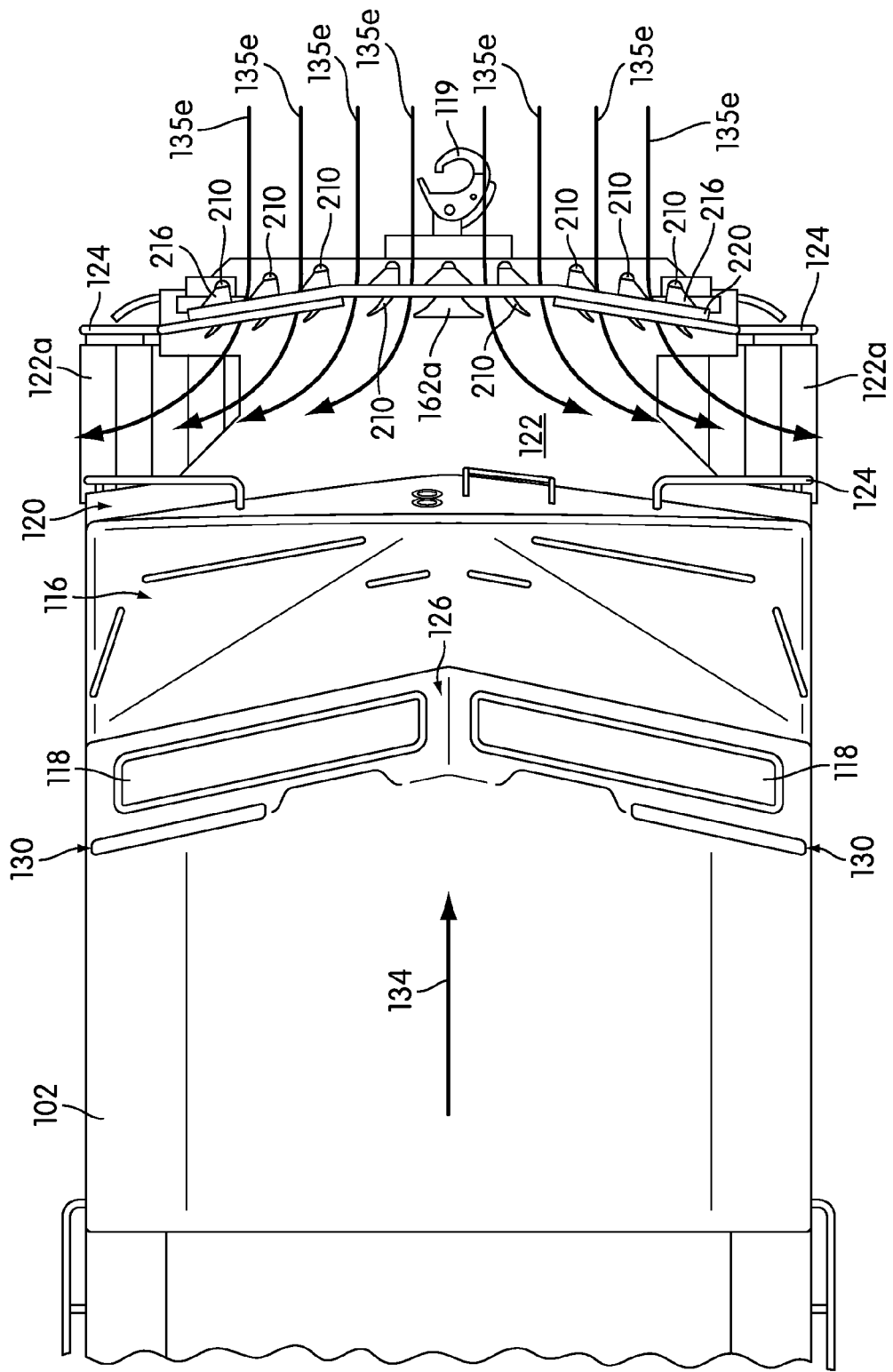
FIG. 15 illustrates a top view of a locomotive having another alternate system of aerodynamic drag reducing devices attached thereto in accordance with an embodiment of the present invention.
Figure 16:
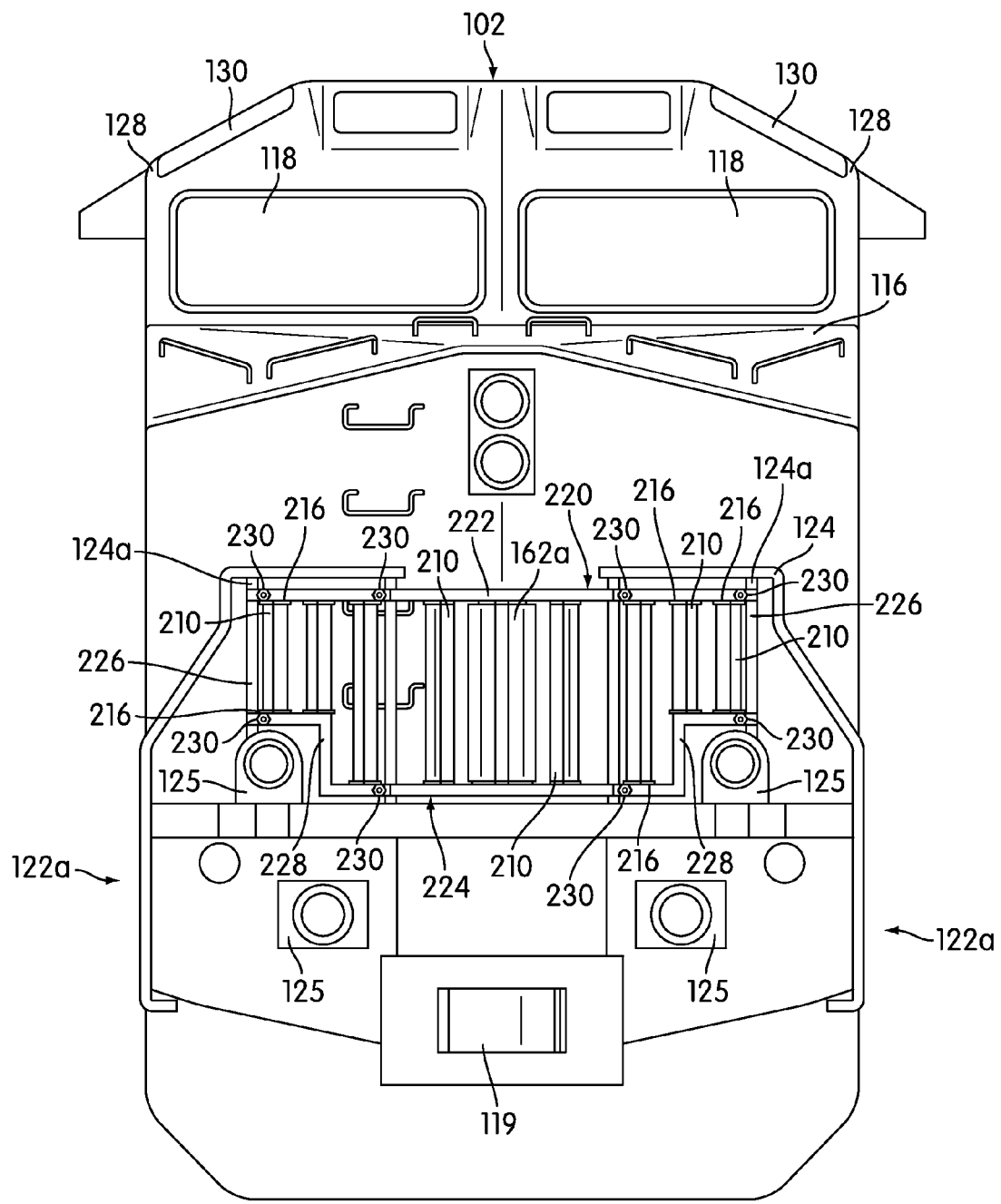
FIG. 16 illustrates a front view of the front end of the locomotive of FIG. 15 with the aerodynamic drag reducing devices in accordance with an embodiment of the present invention.

FIGS. 15 and 16 illustrate views of the front end 109 and front face 116 of a locomotive 102 having a center drag reducing device 162*a* and a plurality of aerodynamic drag reducing devices 210 thereon, mounting with respect to the walkway 122 and step areas 122*a*, as well as the handrail(s) 124 and front end 109 (e.g., coupling 119) of the locomotive 102. In this example embodiment, the center drag reducing device 162*a* and the plurality of aerodynamic drag reducing devices 210 may be configured to be mounted adjacent the walkway 122 and/or on the handrail(s) 124 using a single, unitary mounting frame assembly or mounting structure 220.

Generally, the devices 162*a* and 210 are mounted in such a manner so as to redirect or deflect air flow in a controlled manner away from the front nose 120 and toward the sides of the locomotive, as represented by arrows 135*e*, during travel. The air may be directed at any angle away from the front end 109 of the locomotive 102. For example, each device 210 may be angled with respect to a centerline of the locomotive 102 so as to reduce drag on the locomotive. In some embodiments, the devices 162*a* and 210 may be mounted on a platform near the walkway 122 on the front end 109, such as in between handrails 124. In some embodiments, the devices 162*a* and 210 may be attached to the front handrails 124. In some embodiments, the devices 162*a* and 210 are mounted to the vertical members of the handrails 124. Generally, the devices 162*a* and 210 are mounted in such a manner such that they do not interfere with the walkway 122 or platform area itself or the leading edge thereof. For example, the devices 162*a* and 210 may be mounted and arranged so as to not obstruct lateral passage of a person on or along the walkway 122 and also so as not to interfere with use of a coupling 119 on the front end 109 of the locomotive.

In some embodiments, center drag reducing device 162*a* need not be provided.

Preferably, the proximal edges of the devices 210 are at least approximately 18 inches to approximately 24 inches from the face of the locomotive, thus allowing free passage on a walkway 122. In some embodiments, the location or distance of the proximal edges of the devices 210 may be determined based off of the dimensions of the walkway 122, for example. Likewise, it is preferred that the distal edges of the devices 210 do not extend to the coupling 119 on the end 109 of the locomotive (e.g., see FIG. 15).

Figure 18:
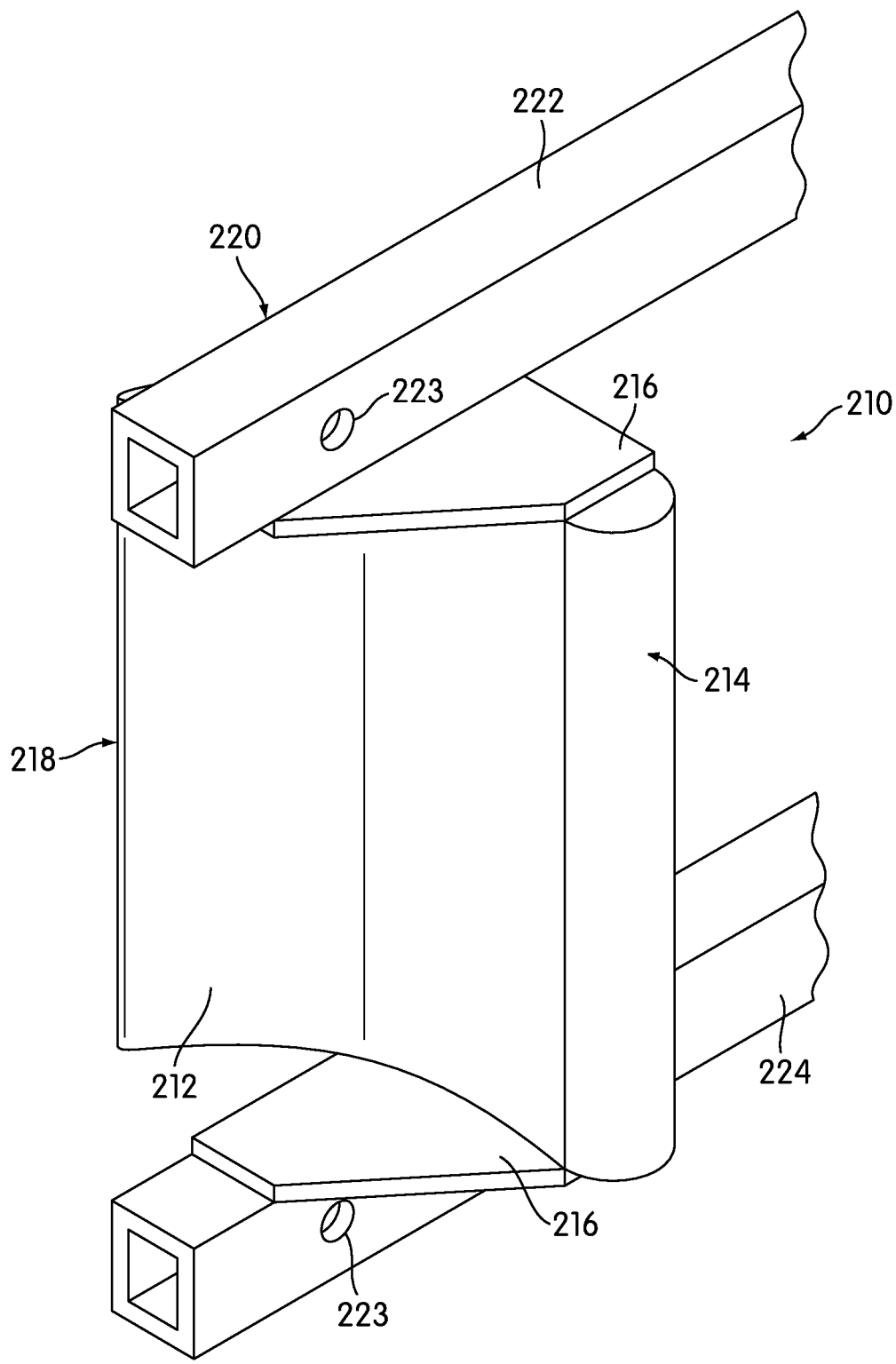
FIG. 18 illustrates a detailed view of the attachment of an aerodynamic drag reducing device to the frame assembly in accordance with an embodiment of the present invention.

Further, the shape of the devices 210 may also assist in directing the airflow. The devices 210 generally comprise a radiussed surface or edge. As can be seen in FIG. 18, for example, the devices 210 may comprise a curved configuration having a solid curved body 212 for directing air laterally towards the sides of the train and away from a front end 109 of the locomotive. The body 212 concaves away from the locomotive and convexes toward the locomotive. More specifically, the plurality of aerodynamic drag reducing devices 210 each comprise curved configurations with a front leading edge 214 or nose with a rounded edge and a back curved edge 218. The body 212 curves in a concave configuration with respect to the front and back edges 214, 218. In an embodiment, each of the aerodynamic fairing devices 210 may comprise a single, contiguous shape that is attached relative to the handrails 124 and walkway(s) 122. In some embodiments, the aerodynamic drag reducing devices 210 may comprise a plurality of fairings, such as a first and second fairing device, to form a substantially curved configuration when mounted in a manner that is similar to that as represented by curved body 212, for example.

The devices 210 may be mounted at a plurality of angles with respect to the centerline of the locomotive 102. The angle for positioning each of the devices 210 may be orientated based on the specifications of the walkways 122 of the respective locomotive 102. In some cases, each of the devices 210 may be provided at similar angles. In some cases, each of the devices 210 may be provided at different angles.

The dimensions of each of the devices 210 may be such that they corresponding to the dimensions of the locomotive 102. For example, the devices may comprise a length, width, or height such that the devices 210 may be mounted or attached between the vertical and horizontal members of the handrail 124. Such dimensions, therefore, should not be limiting.

Like the device 162 of FIG. 9, the center drag reducing device 162*a* is designed to be mounted to a center location on the front end 109 with respect to the front face 116 of the locomotive 102. The center mounted aerodynamic drag reducing device 162*a* may comprise a configuration substantially similar to that of a triangular prism with curved sides and edges. That is, the device may comprise a polyhedron shape made of a substantially triangular base and top portion connected by 3 substantially rectangular sides designed to reduce drag. In an embodiment, at least two of the rectangular sides of the triangular prism device may comprise curved configurations which concave away from the locomotive body. That is, the side surfaces and edges may be angled or curved so as to direct air away from a centerline of the locomotive 102. The third side (e.g., the back side) may comprise a substantially rectangular shape, and may be curved or substantially straight. Alternatively, a third side need not be provided.

The drag reducing device 162*a* may be designed such that its dimensions allow for its sides to vertically extend from a top deck of the walkway 122 to the handrail 124. In some cases, the dimensions of the device 162*a* may be such that they correspond to dimensions associated with the locomotive 102 and its features (e.g., the dimensions of the handrail 124, walkway 122, spaces in the handrail, etc.). Device 162*a* may comprise a length, width, and/or height such that it may be mounted or attached to or between vertical and horizontal members of the handrail 124. The dimensions of device 162*a* should not be limiting.

In the illustrated embodiment, the devices 162*a* and 210 are mounted generally vertically to one or more members of the handrail(s) 124. For example, the devices 210 may be mounted such that each device 210 extends outwardly and towards the body of the locomotive from a distal edge thereof to a proximal edge thereof. The devices 210 are each coupled with a leading or front edge 214 thereof close to the locomotive centerline, and a trailing or back edge 218 farther from the centerline. This orientation allows the curved body 212 of the devices 210 to divert the airflow laterally towards the sides of the locomotive 102, thus reducing impingement of the airflow on the locomotive's front face 116 and the associated drag.

The devices 162*a* and 210 may be attached or mounted to the walkways 122, handrails 124, or a location adjacent thereto (e.g., platform) in any number of ways. For example, the plurality of aerodynamic drag reducing devices 162*a* and 210 may be mounted to the locomotive using the single, unitary mounting structure 220, as shown in detail in FIGS. 17-21.

Figure 17:
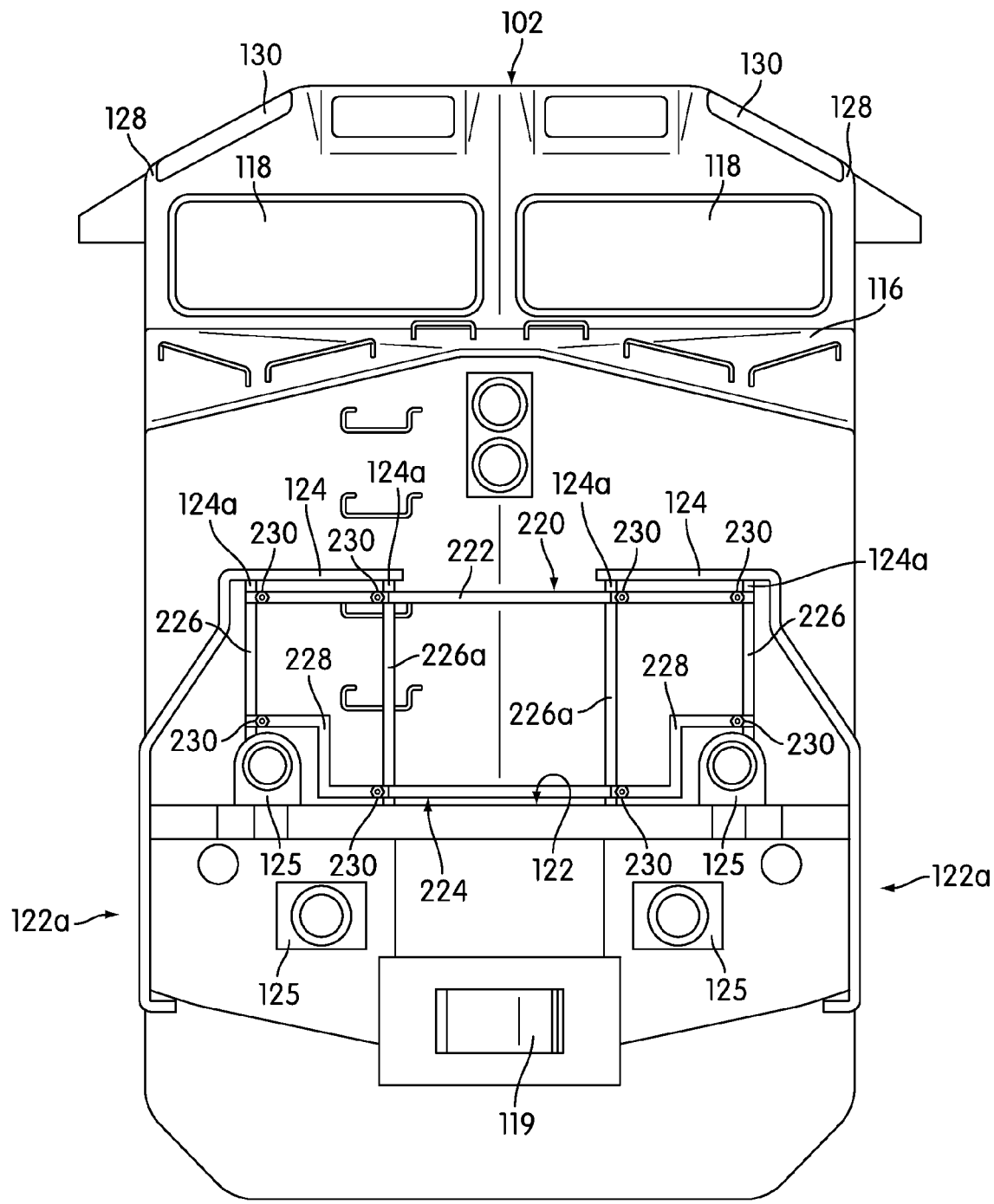
FIG. 17 illustrates a front view of the front end of the locomotive of FIG. 15 having a single mounting frame assembly structure attached thereto in accordance with an embodiment of the present invention.

FIGS. 17-21 illustrate detailed views of an example of how the frame assembly or mounting structure 220 and their respective devices 162*a* and 210 are attached to a front end 109 of a locomotive 102. For illustrative purposes only, FIG. 17 illustrates the attachment of the mounting structure 220 to vertical and horizontal members 124*a* or stanchions of the handrails 124 without the drag reducing devices 162*a*, 210 or fairings thereon. The mounting structure 220 is designed to enable one or more operators or crew workers to mount a plurality of aerodynamic drag reducing devices to the front end of the locomotive at once. For example, rather than individually mounting a drag reducing device such as 150 to the walkway 122 or handrail 124, the drag reducing devices as described in this example embodiment are attached to the mounting structure 220 and the mounting structure 220 may then be mounted to the locomotive 102. Additional details regarding mounting the drag reducing devices and structure are provided further below.

The mounting structure 220 comprises at least a top horizontal rail 222, a bottom horizontal rail 224, and vertical side rails 226 which are connected together to form the unitary frame assembly. The mounting structure 220 may comprise a generally rectangular or polygonal configuration. In some embodiments, one more middle vertical struts 226a may also be provided to further stabilize the mounting structure 220 and provide mounting areas thereon. For example, middle vertical struts 226a may be positioned to align with vertical members 124a of the handrail 124, to assist in easing the attachment of the structure 220. Additionally, in some embodiments, the mounting structure 220 may be configured to include alternate rails 228 in the corners or other portions of the structure body. For example, as shown in FIG. 17, the locomotive 102 may comprise headlights 125 or spotlights on the front of the walkway 122 or platform. In this case, alternate rails 228 may be configured to allow for clearance around the lights 125. For example, the rails 228 are positioned at right angles with respect to the bottom and side rails 224, 226 and joined to each other and the rails 224, 226 to form the unitary frame assembly.

The mounting structure 220 may be formed from any number of materials and should not be limiting. For example, in some cases, the frame may be formed from 1 inch square tubing that is welded or attached together using other known techniques. The tubing may be formed from metal (e.g., steel, aluminum) or from plastic materials, for example.

In some cases, the mounting structure 220 and/or devices 162a and 210 thereon may be configured such that they are mounted to include clearances (e.g., as required by standards or for convenience purposes). For example, the mountable frame assemblies or structure 220 may be mounted to provide clearances up to and including approximately 4 inches between the devices 162a, 210 and other objects (such as the handrails 124 and walkways 122, for example).

As noted above, the drag reducing devices 162a and 210 may be attached to the mounting structure 220 (e.g., at a railyard or shop or remote location), and the mounting structure 220 may then be mounted to the locomotive 102 so as to mount a plurality of drag reducing devices to the front of the locomotive at one time. FIG. 18 illustrates a detailed view of the attachment of an aerodynamic drag reducing device 210 to the frame assembly 220 in accordance with an embodiment of the present invention. For clarity purposes only, the side rail 226 between the top and bottom rails 222, 224 is not shown. However, it is to be understood that the side rail 226 may be provided in the mounting structure 220, before, during, or after the mounting or attachment of each of the plurality of aerodynamic drag reducing devices 210 to the mounting structure. Alternatively, the side rails 226 may be provided after mounting a top and bottom rail 222, 224 of the mounting structure 220 to the handrail 124.

The body 212 of the drag reducing device 210, as shown, has a mounting plate 216 on a top side and a bottom side. The mounting plates 216 on either side of the device 210 act as stiffening devices for positioning each of the devices 210 with respect to a centerline of the locomotive 102. In some instances, the mounting plates 216 are used to permanently align a device at an angle with respect to the centerline of the locomotive 210. Thus, each device 210 that is mounted to the mounting structure 220 is positioned and aligned before the mounting structure 220 is attached to the handrail 124 of the locomotive 102. Such an assembly may be advantageous for the non-limiting reason that it allows for the reduction in the amount of assembly time for positioning and attaching drag reducing devices to a locomotive. Furthermore, if the dimensions and features of a locomotive are known, the assembly may be customized to the locomotive.

Referring back to FIG. 18, the mounting plates 216 on either side of the drag reducing device 210 are attached to the top horizontal rail 222 and the bottom horizontal rail 224. The plates 215 may be secured using any number of techniques, including, but not limited to, welding, adhesives, and fasteners. Each of the plurality of drag reducing devices 210 is attached to the top and bottom rails 222 and 224 in a similar manner.

At least the top and bottom horizontal rails 222 and 224 may also include openings 223 in locations along their lengths or bodies which may be used to assist in attaching the mounting structure 220 to the locomotive 102. Although one opening 223 is shown in each of the top and bottom rails 222, 224, it is to be understood, particularly with regarding to the description of FIGS. 19-21, that any number of openings 223 may be provided.

Figure 19:
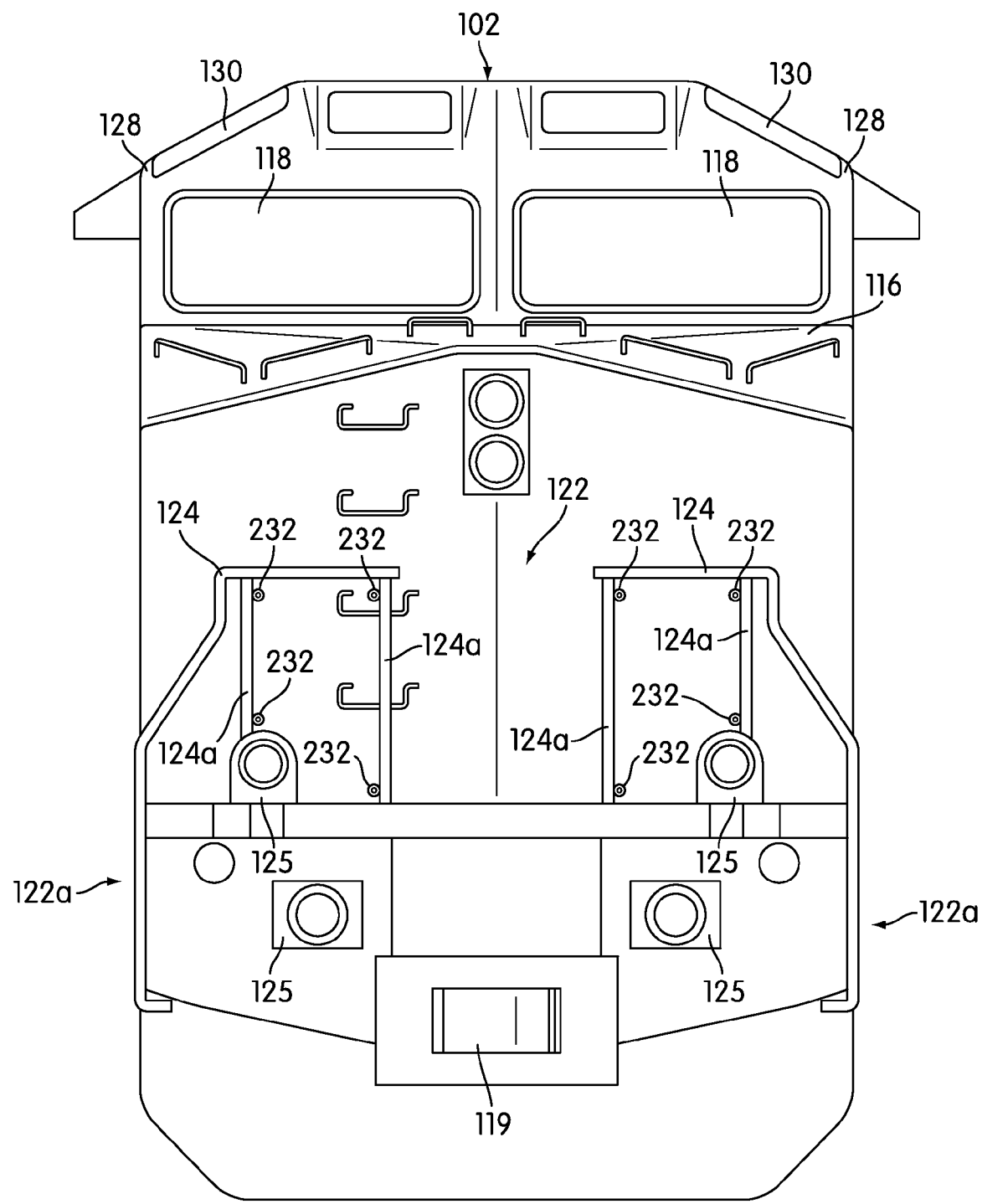
FIGS. 19-21 illustrate detailed views for attaching the frame assembly to the locomotive in accordance with an embodiment of the present invention.
Figure 20:
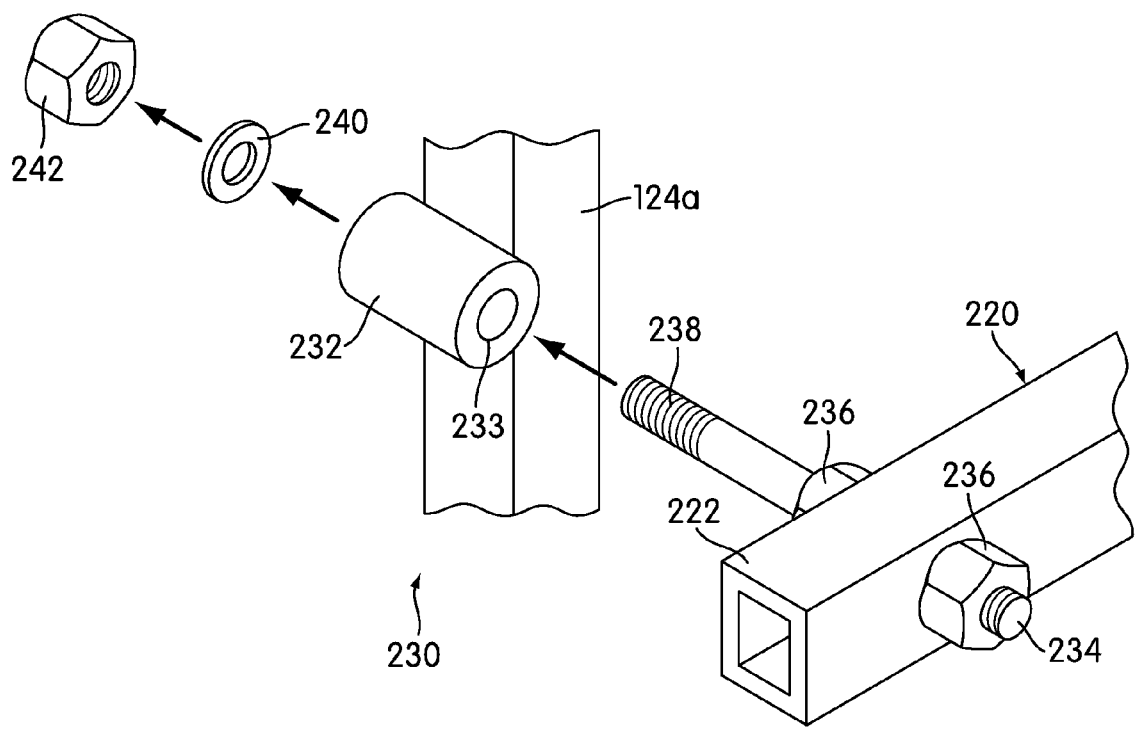
Figure 21:
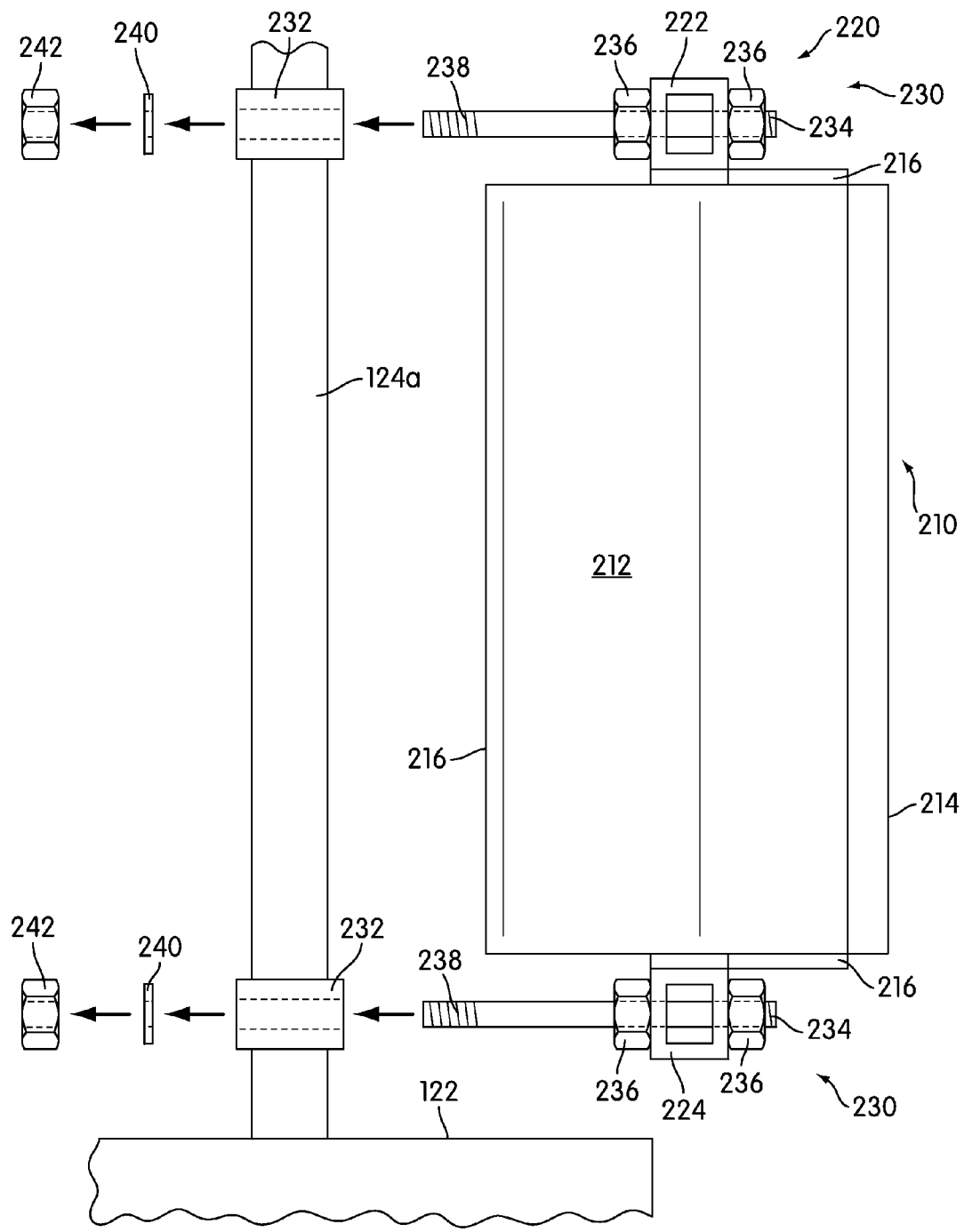

After each of the drag reducing devices 162a and/or 210 are attached to the mounting structure 220, and the mounting structure 220 is ready for attachment, it may be mounted to the locomotive 102. FIGS. 19-21 illustrate detailed views for attaching the frame assembly or mounting structure 220 to the handrail 124 of the locomotive 102 using connection devices 230 in accordance with an embodiment. The connection devices 230 generally comprise a plurality of support tubes 232, bolts 234, nuts 236, washers 240, and locking nuts 242. Of course, other mechanical devices or connecting methods may also be used.

The support tubes 232 are provided for attachment of the frame assembly to the handrail. The support tubes 232 generally comprise a round shape and an opening 233 therethrough. The support tubes 232 may comprise, for example, approximately a 1 inch inner diameter and a length of approximately 2 inches. The dimensions of the support tubes 232, however, should not be limiting.

As shown in FIG. 19, support tubes 232 of the connection devices 230 are first positioned on and attached to (e.g., via welding) the vertical members 124a of the handrail 124, such that their openings 233 are provided on a horizontal axis. The support tubes 232 are provided on the handrail 124 in locations that allow for mounting of the mounting structure 220. For example, the support tubes 232 may be welded in to positions corresponding to the dimensions of the aerodynamic drag reducing devices 162a and 210 such that the openings 233 of the support tubes 232 will be positioned in line with the openings 223 on a horizontal axis (e.g., so that connection devices 230 may be provided therethrough). Furthermore, they may be positioned corresponding to the rails of the mounting structure 220. As shown in FIG. 19, support tubes 232 are positioned in locations along the vertical members 124a of the handrail 124 so that the center device 162a is substantially aligned in the center of the handrail 124 (e.g., where the open space or section is provided) and that the drag reducing devices 210 are mounted adjacent the walkway 122.

The single, unitary mounting frame assembly or structure 220 is then attached to the support tubes 232 on the handrail 124 by inserting a number of bolts 234 with threaded ends 238 through the openings 223 of the rails 222, 224 of the mounting structure 220. For example, as shown in detail in FIG. 20, one end of a bolt 234 may be fastened via one or more nuts 236 to a rail 222 of the mounting structure 220. The second, extended threaded end 238 of the bolt 234 is aligned and inserted through the opening 233 of a support tube 232 that is positioned or attached to the vertical member 124a of the handrail 124. After being inserted therethrough, the threaded end 238 of the bolt 234 may be secured via a washer 240 and locking nut 242.

The side view as shown in FIG. 21 illustrates an example of aligning a plurality of bolts 234 from the mounting structure 220 with a plurality of support tubes 232 attached to the handrail 124. Generally, as noted above, the top and bottom horizontal rails 222 and 224 are aligned with respect to the support tubes 232 and the bolts 234 and other fastening devices of the connection devices 230 are used to secure the plurality of drag reducing devices 162a and 210 on the mounting structure 220 to the front of the locomotive 102.

The type of fairing used with the aerodynamic drag reducing devices 130, 142, 142a, 148, 150, 158, 160, 162, 196, and 250 may include any number of shapes, sizes, and/or materials and should be limiting. For example, in some embodiments, the fairings, such as fairing 132 of device 130, comprise at least one radiused edge. In an embodiment, fairings may comprise a first, substantially rounded side and a second, substantially flat side. For example, the second substantially flat side may be the side which is used for mounting the device to the locomotive 102. The fairings may comprise a curved configuration, and may be formed or retrofit to the dimensions of the locomotive 102 to which they are attached. Aerodynamic drag reducing devices as shown in the Figures provide an example of such designs.

Additionally, the type of materials to form the aerodynamic fairing devices 130, 142, 142a, 148, 150, 158, 160, 162, 196, and 250 should not be limiting. In some embodiments, the devices 130, 142, 142a, 148, 150, 158, 160, 162, 196, and 250 comprise a lightweight, stretchable material that is designed to accommodate changes in shape. In some embodiments, the devices 130, 142, 142a, 148, 150, 158, 160, 162, 196, and 250 comprise lightweight, durable, shaped pieces of foam, fiberglass, or other conformable, moldable, or shapeable materials. In an embodiment, the fairings may comprise a lightweight material that is able to withstand the aerodynamic forces to which it will be subjected (e.g., withstands forces of 12-mph head winds when moving in a forward direction 134). In some instances, the fairings may form a shroud. Various aerodynamic fairings or streamline shapes can be fabricated or manufactured from plastic foam, metal (e.g., aluminum), plastic, or liquid molding resin (LMR) as well.

Furthermore, it should be noted that the methods of attaching the aerodynamic drag reducing devices 130, 142, 142a, 148, 150, 158, 160, 162, 196, and 250 should not be limiting. As noted, in some embodiments, an attachment frame may be provided. In other embodiments, for example, the aerodynamic drag reducing devices may comprise a drag reducing fairing, an attachment frame, and at least one mounting device. In an embodiment in accordance with this invention, for example, it is envisioned that the mounting assemblies 164 and 174 as shown in FIGS. 10 and 11 may be connected to attached as a single unitary assembly for mounting onto the front end 109 of the locomotive 102. That is, in a similar manner to the mounting structure 220 as shown in FIGS. 15-21, the "T"-shaped mounting assembly 164 may be attached to the mounting assemblies 174 for the drag reducing devices 150 before mounting to the locomotive 102 or its handrail 124. Also, other attachment devices, such as pins or any type of releasable clamping or locking device may be provided for releasably securing the aerodynamic drag reducing devices as described herein. Further, though not shown, it is envisioned that a plurality of drag reducing devices may be provided in a one-piece mold sheet or other configuration that includes a plurality of open slots and integral vanes formed therein. Such embodiments are within the scope of this invention.

Also, the locations for which mounting the drag reducing devices 130, 142, 142a, 148, 150, 158, 160, 162, 196, and 250 should also not be limiting. The drag reducing devices may be mounted directly to a plurality of areas and/or objects on the front face 116 of the locomotive 102 or may be mounted to frames which are designed to attach to the front face 116, for example. The devices are designed such that they may be easy to install by operators along the front side 109, back side 138, or cab of the locomotive 102.

Of course, it should be noted that the location of the "front" end 109 and "back" end 138 of the locomotive 102 are not to be limiting. For example, in some cases, the locomotive 102 may be mounted in the train 100 such that a back end 138 is attached such that it is leading. Alternatively, the locomotive 102 may refer to a locomotive consist, and the connection or coupling of two or more locomotives may be determined relative to their location or relative to their characteristics (e.g., shape, walkways, etc.), for example. Thus, any of the drag reducing devices described herein may be mounted or moved to an area corresponding or relative to the generally described configurations.

Generally, the aerodynamic drag reducing devices should be mounted or attached such that they help redirect the flow of air as the locomotive 102 of the train 100 proceeds along a track, particularly at high speeds. For example, is it noted that the devices 150 or 210 may be positioned at an angle so as to extend outwardly and towards the locomotive body. The angles at which the devices 150 and 210 are positioned should not be limiting. Further, the angles at which the devices 150 or 210 are positioned need not be the same. For example, the devices 210 of FIGS. 15-16 may be positioned in an embodiment such that the angles at which the devices 210 are positioned with respect to a centerline widen toward the outer edge or sides of the locomotive. That is, the openings or deflection angles of the devices 210 may decrease from the centerline (greatest deflection) outboard toward the sides of the locomotive 102.

The devices 130, 142, 142a, 148, 150, 158, 160, 162, 196, and 250 also reduce vortices or eddy currents such as the angled exterior corners near the nose 120 of the locomotive 102. Thus, aerodynamic fairing attachment devices may also assist in reducing fuel consumption (and its cost) and therefore increase the efficiency of a train.

As such, the aerodynamic drag reducing devices described herein provide several advantageous features. For example, a properly designed device, such as device 130 with fairing 132, securely attached to a front 109 of a locomotive 102 will significantly reduce aerodynamic drag at a front end of the train when moving in a forward direction 134. Additionally or alternatively, the drag reducing devices 142, 142a, or 148 may be attached to a back end 138 of the locomotive 102 to reduce the aerodynamic drag provided by a rear section of the train 100. Such a reduction in aerodynamic drag and vortices (whether with respect to the front, side, or back ends of the locomotive 102) thus provides the potential to reducing fuel consumption. A small reduction in fuel consumption, such as one percent, may equate to a reduction of running costs by several million dollars annually for a large rail operator.

Improvements in railroad freight train fuel efficiency are typically made in incremental steps. It is estimated that a leading locomotive (first locomotive of a series of a locomotive consist) equipped with a variety of the proposed aerodynamic drag reducing devices or streamlinings could achieve up to and between approximately 0.5% to approximately 1.0% improvement in over-the-road fuel efficiency, by reducing its aerodynamic resistance at the front end. Such an improvement in fuel efficiency not only means an approximate 0.5% to an approximate 1.0% reduction, in general terms, in fuel consumption, but also a corresponding reduction in regulated diesel exhaust emissions emanating from the locomotive's diesel engine.

Thus, the proposed freight locomotive streamlining concept not only can reduce U.S. freight train fuel consumption, particularly at higher operating speeds, but can also reduce the contribution of those freight trains to global warming (a reduction in diesel fuel consumption is linearly proportional to a reduction in CO2 which is a classic "green house gas"), oxides of nitrogen (a precursor to formation of ozone and photochemical smog), and particulate matter (a health concern), not to forget carbon monoxide or CO, unburnt hydrocarbons ("HCs"), and other emittants. Additionally, the devices themselves do not create significant lift and is low in cost to produce.

The drag reducing devices are also advantageous as it is designed such that it may be easy to install by operators as conventional locomotives need not be adjusted or modified. The devices also allow for simplified installation (or removal) without risk of harm or injury to the fairing, the locomotive, or the operators. The devices may attached or installed on pre-existing locomotives. The systems or methods described may also be applied to newly manufactured locomotives at a factory or assembly site (e.g., such as those built according to standards).

There have been little previous attempts to retrofit aerodynamically and cost effective streamlined shapes to diesel freight locomotives on North America because no emphasis has been placed on even small improvements in aerodynamic drag reduction. Such locomotives have been manufactured, selectively by various manufacturers, with aerodynamic shapes (such as rounded corners), but such aerodynamic treatment has fallen out of standard practice in the interest of simplified designs which facilitate welding of steel carbodies with minimal manual labor for adjusting parts, hand welding, etc. The aerodynamic drag reducing devices 130, 142, 142*a*, 148, 150, 158, 160, 162, 196, and 250 described herein solve such problems and even improve performance characteristics.

Also, the number or amount of aerodynamic drag reducing devices that are mounted or attached to the locomotive 102 should not be limiting. For example, although FIGS. 3-5 show the attachment of aerodynamic fairing devices 130 and 150 to specific locations on the front face 120 and front end 109 of the locomotive 102, devices 130 and 150 may be provided in other locations. For example, the devices 130 or 150 may be provided in any number of areas along the front face 120 or front end 109. In some embodiments, it is envisioned that aerodynamic drag reducing devices may be attached to a top of the front nose 120 in front of the windshield 118 and its panels. Further, for example, should the locomotive 102 comprise a plurality of cabs, aerodynamic extensions 142 or 142*a* may be provided at the back end 138 of each cab 102*a*, 102*b*, etc.

While the principles of the invention have been made clear in the illustrative embodiments set forth above, it will be apparent to those skilled in the art that various modifications may be made to the structure, arrangement, proportion, elements, materials, and components used in the practice of the invention.

For example, it should be noted that it is within the scope of the invention that the aerodynamic drag reducing devices 130, 142, 142*a*, 148, 150, 158, 160, 162, 196, and 250 for the locomotive 102 described herein may be used individually or in any number of combinations with each other. Also, it is within the scope of the invention that the devices 130, 142, 142*a*, 148, 150, 158, 160, 162, 196, and 250 may be used individually or in combination with other devices, such as aerodynamic drag reducing devices designed for application to containers or stacked containers, such as those as disclosed in U.S. patent application Ser. No. 12/118,393 to Iden et al., filed on May 9, 2008, or U.S. patent application Ser. No. 12/259,059 to Iden et al, filed on Oct. 27, 2008, both of which are herein incorporated by reference in their entirety. It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A locomotive comprising:
a body;
track engaging wheels;
a power system in the body for driving the wheels to move the locomotive along a pair of tracks;
a walkway provided at a longitudinal end of the locomotive, the walkway extending to enable lateral passage of a person across the longitudinal end of the locomotive;
a handrail extending vertically and laterally along the walkway in a spaced relation to a face of the longitudinal end of the locomotive body for grasping by a person on the walkway;
a plurality of aerodynamic drag reducing devices attached adjacent to the walkway, each drag reducing device being positioned with respect to a centerline of the locomotive so as to reduce drag on the locomotive,
wherein the aerodynamic drag reducing devices are in a spaced relation to the face of the longitudinal end of the locomotive body so as to permit lateral passage of a person along the walkway.

2. The locomotive according to claim 1, wherein the drag reducing devices are positioned at an angle such that each drag reducing device extends outwardly and towards the body from a distal edge thereof to a proximal edge thereof.

3. The locomotive according to claim 2, wherein the angle for positioning each of the drag reducing devices is adjustable.

4. The locomotive according to claim 2, wherein the proximal edges of the drag reducing devices are at least 18 inches from the face of the longitudinal end of the locomotive body.

5. The locomotive according to claim 1, wherein the plurality of aerodynamic drag reducing devices are attached to the handrail.

6. The locomotive according to claim 5, wherein the drag reducing devices are mounted to vertical members of the handrail.

7. The locomotive according to claim 1, wherein the plurality of aerodynamic drag reducing devices comprise curved configurations which concave away from the locomotive body and convex toward the locomotive body.

8. The locomotive according to claim 1, wherein at least one of the plurality of aerodynamic drag reducing devices comprises a configuration of a triangular prism, and wherein at least two sides of the triangular prism comprise curved configurations which concave away from the locomotive body.

9. The locomotive according to claim 1, wherein the walkway is provided at a front, leading end of the locomotive.

10. The locomotive according to claim 1, further comprising a plurality of aerodynamic drag reducing devices attached to an opposite longitudinal end of the locomotive, each drag reducing device being mounted on a corresponding face of the opposite longitudinal end so as to induce laminar flow of air and reduce drag on the locomotive.

11. A method for reducing aerodynamic drag of a locomotive, the locomotive comprising a body; track engaging wheels; a power system in the body for driving the wheels to move the locomotive along a pair of tracks; and a walkway provided at a longitudinal end of the locomotive, the walkway extending to enable lateral passage of a person across the longitudinal end of the locomotive and including a handrail extending vertically and laterally in a spaced relation to a face of the longitudinal end of the locomotive; the method comprising:
mounting a plurality of aerodynamic drag reducing devices to the longitudinal end of the locomotive adjacent to the walkway, each drag reducing device being positioned with respect to a centerline of the locomotive so as to reduce drag on the locomotive,
wherein the aerodynamic drag reducing devices are in a spaced relation to the face of the longitudinal end of the locomotive so as to permit lateral passage of a person along the walkway.

12. The method according to claim 11, wherein the mounting of the plurality of aerodynamic drag reducing devices further comprises attaching the drag reducing devices to the handrail.

13. The method according to claim 11, further comprising adjusting an angle of one or more drag reducing devices such that the device extends outwardly and towards the body from a distal edge thereof to a proximal edge thereof.

14. The method according to claim 11, further comprising mounting a plurality of aerodynamic drag reducing devices to an opposite longitudinal end of the locomotive, each drag reducing device being mounted on a corresponding face of the opposite longitudinal end so as to induce laminar flow of air and reduce drag on the locomotive, and each drag reducing device comprising a curved surface and at least one pair of winglets.

15. A train comprising:
at least one locomotive, the at least one locomotive comprising a body and track engaging wheels;
a series of cars with wheels, the series comprising at least a first car and a second car;
the at least one locomotive configured to assist in moving the series of cars;
a power system for driving the track engaging wheels of the locomotive to move the locomotive and the series of cars along a pair of tracks;
a walkway provided at a longitudinal end of the locomotive, the walkway extending to enable lateral passage of a person across the longitudinal end of the locomotive;
a handrail extending vertically and laterally along the walkway in a spaced relation to a face of the longitudinal end of the locomotive body for grasping by a person on the walkway;
a plurality of aerodynamic drag reducing devices attached to the longitudinal end of the locomotive adjacent to the walkway, each drag reducing device being positioned with respect to a centerline of the locomotive so as to reduce drag on the train,
wherein the aerodynamic drag reducing devices are in a spaced relation to the face of the longitudinal end of the locomotive body so as to permit lateral passage of a person along the walkway.

16. The train according to claim 15, wherein a locomotive is directly attached to the first car.

17. The train according to claim 15, wherein a plurality of locomotives are provided in the train, and wherein the at least one locomotive is provided between the first car and the second car.

18. The train according to claim 15, wherein the drag reducing devices are positioned at an angle such that each drag reducing device extends outwardly and towards the body of the locomotive from a distal edge thereof to a proximal edge thereof.

19. The train according to claim 18, wherein the angle for positioning each of the drag reducing devices is adjustable.

20. The train according to claim 15, wherein the plurality of aerodynamic drag reducing devices are attached to the handrail of the locomotive.

21. The train according to claim 15, wherein plurality of aerodynamic drag reducing devices comprise curved configurations which concave away from the locomotive body and convex toward the locomotive body.

22. The train according to claim 15, wherein at least one of the plurality of aerodynamic drag reducing devices comprises a configuration of a triangular prism, and wherein at least two sides of the triangular prism comprise curved configurations which concave away from the locomotive body.

23. The train according to claim 15, wherein the walkway is provided at a front, leading end of the locomotive.

24. The train according to claim 15, further comprising a plurality of aerodynamic drag reducing devices attached to an opposite longitudinal end of the locomotive body, each drag reducing device being mounted on a corresponding face of the opposite longitudinal end so as to induce laminar flow of air and reduce drag on the locomotive, and each drag reducing device comprising a curved surface and at least one pair of winglets.

25. A locomotive comprising:
a body;
track engaging wheels;
a power system in the body for driving the wheels to move the locomotive along a pair of tracks;
a walkway provided at a longitudinal end of the locomotive;
a handrail extending vertically and laterally along the walkway in a spaced relation to a face of the longitudinal end of the locomotive body for grasping by a person on the walkway;
a plurality of aerodynamic drag reducing devices attached adjacent the walkway, each drag reducing device being positioned with respect to a centerline of the locomotive so as to reduce drag on the locomotive,
wherein the aerodynamic drag reducing devices are in a spaced relation to the face of the longitudinal end of the locomotive body so as to permit lateral passage of a person along the walkway, and wherein each of the plurality of aerodynamic drag reducing devices are attached to the walkway using separately mountable assemblies.

26. A locomotive comprising:
a body;
track engaging wheels;

a power system in the body for driving the wheels to move the locomotive along a pair of tracks;

a walkway provided at a longitudinal end of the locomotive;

a handrail extending vertically and laterally along the walkway in a spaced relation to a face of the longitudinal end of the locomotive body for grasping by a person on the walkway;

a plurality of aerodynamic drag reducing devices attached adjacent the walkway, each drag reducing device being positioned with respect to a centerline of the locomotive so as to reduce drag on the locomotive, wherein the aerodynamic drag reducing devices are in a spaced relation to the face of the longitudinal end of the locomotive body so as to permit lateral passage of a person along the walkway, wherein the plurality of aerodynamic drag reducing devices are attached to the walkway using a single mountable frame assembly, the plurality of aerodynamic drag reducing devices being mounted to the frame assembly, and wherein the frame assembly is mounted with respect to the handrail.

27. The locomotive according to claim 10, wherein each of the plurality of aerodynamic drag reducing devices on the corresponding face comprise a curved surface and at least one pair of winglets for inducing laminar flow of air and reducing drag on the locomotive.

28. The locomotive according to claim 27, wherein the winglets are mounted at an angle relative to each other such that a distance between proximal ends of the winglets is smaller than a distance between distal ends of the winglets.

29. A train comprising:

at least one locomotive, the at least one locomotive comprising a body and track engaging wheels;

a series of cars with wheels, the series comprising at least a first car and a second car;

the at least one locomotive configured to assist in moving the series of cars;

a power system for driving the track engaging wheels of the locomotive to move the locomotive and the series of cars along a pair of tracks;

a walkway provided at a longitudinal end of the locomotive;

a handrail extending vertically and laterally along the walkway in a spaced relation to a face of the longitudinal end of the locomotive body for grasping by a person on the walkway;

a plurality of aerodynamic drag reducing devices attached to the longitudinal end of the locomotive adjacent the walkway, each drag reducing device being positioned with respect to a centerline of the locomotive so as to reduce drag on the train, wherein the aerodynamic drag reducing devices are in a spaced relation to the face of the longitudinal end of the locomotive body so as to permit lateral passage of a person along the walkway, and wherein each of the plurality of aerodynamic drag reducing devices are attached to the walkway using separately mountable assemblies.

30. A train comprising:

at least one locomotive, the at least one locomotive comprising a body and track engaging wheels;

a series of cars with wheels, the series comprising at least a first car and a second car;

the at least one locomotive configured to assist in moving the series of cars;

a power system for driving the track engaging wheels of the locomotive to move the locomotive and the series of cars along a pair of tracks;

a walkway provided at a longitudinal end of the locomotive;

a handrail extending vertically and laterally along the walkway in a spaced relation to a face of the longitudinal end of the locomotive body for grasping by a person on the walkway;

a plurality of aerodynamic drag reducing devices attached to the longitudinal end of the locomotive adjacent the walkway, each drag reducing device being positioned with respect to a centerline of the locomotive so as to reduce drag on the train, wherein the aerodynamic drag reducing devices are in a spaced relation to the face of the longitudinal end of the locomotive body so as to permit lateral passage of a person along the walkway, wherein the plurality of aerodynamic drag reducing devices are attached to the walkway using a single mountable frame assembly, the plurality of aerodynamic drag reducing devices being mounted to the frame assembly, and wherein the frame assembly is mounted with respect to the handrail.

31. A system for reducing aerodynamic drag of a locomotive, the locomotive configured to pull a series of cars along a track; the locomotive comprising a body with a front end and a back end and a walkway adjacent at least the front end, the walkway extending to enable lateral passage of a person across the longitudinal end of the locomotive, the system comprising:

a plurality of aerodynamic drag reducing devices, each drag reducing device comprising a drag reducing fairing configured to reduce aerodynamic drag when the locomotive is in motion; and wherein the plurality of aerodynamic drag reducing devices are configured to be mounted to the locomotive on at least the front end adjacent to the walkway.

32. The system according to claim 31, wherein the front end of the locomotive includes a front face, and wherein the plurality of aerodynamic drag reducing devices are provided on a front face thereof.

33. A system according to claim 31, wherein each of the plurality of aerodynamic drag reducing devices further comprises winglet pairs for assisting in directing movement of air when the locomotive is in motion.

* * * * *